United States Patent
Wesolowski et al.

(10) Patent No.: US 11,003,992 B2
(45) Date of Patent: May 11, 2021

(54) DISTRIBUTED TRAINING AND PREDICTION USING ELASTIC RESOURCES

(71) Applicant: Facebook, Inc., Menlo Park, CA (US)

(72) Inventors: Lukasz Wesolowski, Redwood City, CA (US); Mohamed Fawzi Mokhtar Abd El Aziz, Kirkland, WA (US); Aditya Rajkumar Kalro, Los Gatos, CA (US); Hongzhong Jia, Cupertino, CA (US); Jay Parikh, San Ramon, CA (US)

(73) Assignee: Facebook, Inc., Menlo Park, CA (US)

( * ) Notice: Subject to any disclaimer, the term of this patent is extended or adjusted under 35 U.S.C. 154(b) by 868 days.

(21) Appl. No.: 15/785,074

(22) Filed: Oct. 16, 2017

(65) Prior Publication Data

US 2019/0114537 A1 Apr. 18, 2019

(51) Int. Cl.
*G06N 3/08* (2006.01)
*G06N 3/10* (2006.01)

(52) U.S. Cl.
CPC .............. *G06N 3/08* (2013.01); *G06N 3/084* (2013.01); *G06N 3/10* (2013.01); *G06N 3/105* (2013.01)

(58) Field of Classification Search
None
See application file for complete search history.

(56) References Cited

U.S. PATENT DOCUMENTS

| | | | | |
|---|---|---|---|---|
| 9,015,093 B1* | 4/2015 | Commons | .......... | G01C 21/3602 706/26 |
| 9,734,457 B2* | 8/2017 | Vasseur | .............. | G06Q 10/0631 |
| 10,152,676 B1* | 12/2018 | Strom | .................... | G06N 20/10 |
| 2015/0193695 A1* | 7/2015 | Cruz Mota | ............ | G06N 3/084 706/12 |
| 2017/0132513 A1* | 5/2017 | Yu | ............................. | G06N 3/08 |
| 2018/0232601 A1* | 8/2018 | Feng | .................... | G06K 9/4628 |
| 2018/0293492 A1* | 10/2018 | Kalamkar | ............ | G06N 3/0454 |
| 2018/0293493 A1* | 10/2018 | Kalamkar | ................ | G06T 1/20 |
| 2018/0293777 A1* | 10/2018 | Sarel | ...................... | G06T 15/005 |
| 2018/0314934 A1* | 11/2018 | Ben-Avi | ................. | G06N 3/063 |
| 2018/0322365 A1* | 11/2018 | Yehezkel Rohekar | ..................... | G06K 9/6269 |

(Continued)

OTHER PUBLICATIONS

Krizhevsky, "One weird trick for parallelizing convolutional neural networks,", Apr. 2014 (Year: 2014).*

(Continued)

*Primary Examiner* — Kate H Luo

(74) *Attorney, Agent, or Firm* — Baker Botts L.L.P.

(57) ABSTRACT

In one embodiment, a method includes establishing access to first and second different computing systems. A machine learning model is assigned for training to the first computing system, and the first computing system creates a check-point during training in response to a first predefined triggering event. The check-point may be a record of an execution state in the training of the machine learning model by the first computing system. In response to a second predefined triggering event, the training of the machine learning model on the first computing system is halted, and in response to a third predefined triggering event, the training of the machine learning model is transferred to the second computing system, which continues training the machine learning model starting from the execution state recorded by the check-point.

20 Claims, 10 Drawing Sheets

(56) References Cited

U.S. PATENT DOCUMENTS

2018/0330192 A1* 11/2018 Atasu .................... G06F 16/435
2019/0019104 A1* 1/2019 Liu ........................... G06F 9/46
2019/0324759 A1* 10/2019 Yang ........................ G06N 3/08

OTHER PUBLICATIONS

J. Bagga, H. Morsy, and Z. Yao. Opening Designs for 6-pack and Wedge 100. https://code.facebook.com/posts/203733993317833/opening-designs-for-6-pack-and-wedge-100, Mar. 9, 2016.
M. Barnett, L. Shuler, R. van De Geijn, S. Gupta, D.G Payne, and J. Watts. Interprocessor Collective Communication Library (Intercom). In Scalable High-Performance Computing Conference, 1994.
L. Bottou. Curiously fast convergence of some stochastic gradient decent algorithms. Unpublished open problem offered to the attendance of the SLDS 2009 Conference, Jan. 23, 2009.
L. Bottou, F.E. Curtis, and J. Nocedal. Optimization methods for large-scale machine learning. arXiv: 1606.04838, Jun. 16, 2016.
J. Chen, X. Pan, R. Monga, S. Bengio, and R. Jozefowicz. Revisiting Distributed Synchronous SGD. arXiv:1604.00981v2, Apr. 15, 2016.
K. Chen and Q. Huo. Scalable training of deep learning machines by incremental block training with intra-block parallel optimization and blockwise model-update filtering. In ICASSP, 2016.
R. Collobert, J. Weston, L. Bottou, M. Karlen, K. Kavukcuoglu, and P. Kuksa. Natural language processing (almost) from scratch. JMLR, Aug. 2011.
J. Donahue, Y. Jia, O. Vinyals, J. Hoffman, N. Zhang, E. Tzeng, and T. Darrell. DeCAFL A Deep Convolutional Activation Feature for Generic Visual Recognition. In ICML, 2014.
R. Girshick. Fast R-CNN. In ICCV, 2015.
R. Girshick, J. Donahue, T. Darrel, and J. Malik. Rich Feature Hierarchies for Accurate Object Detection and Semantic Segmentation. In CVPR, 2014.
P. Goyal, P. Dollár, R. Girshick, P. Noordhuis, L. Wesolowski, A. Kyrola, A. Tulloch, Y. Jia, and K. He. Accurate, Large Minibatch SGD: Training ImageNet in 1 Hour. arXiv:1706.0277v1, Jun. 8, 2017.
W. Gropp, E. Lusk, and A. Skjellum. Using MPI: Portable Parraell Programming with the Message-Passing Interface. MIT Press, 1999.
S. Gross and M. Wilber. Training and Investigating Residual Nets. https://torch.ch/blog/2016/0204/resnets.html, Feb. 4, 2016.
M. Gürbüzbalaban, A. Ozdaglar, and P. Parrilo. Why Random Reshuffling Beats Stochastic Gradient Decent. arXiv:1510.08560v1, Oct. 29, 2015.
K. He, G. Gkioxari, P. Dollár, and R. Girshick. Mask R-CNN. arXiv:1703.06870v2, Apr. 5, 2017.
K. He, X. Zhang, S. Ren, and J. Sun. Delving Deep into Rectifiers: Surpassing Human-Level Performance on ImageNet Classification. In ICCV, Feb. 2015.
K. He, X. Zhang, S. Ren, and J. Sun. Deep Residual Learning for Image Recognition. In CVPR, 2016.
G. Hinton, L. Deng, D. Yu, G. E. Dahl, A.-r. Mohamed, N. Jaitly, A. Senior, V. Vanhoucke, P. Nguyen, T.N. Sainath, et al. Deep Neural Networks for Acoustic Modeling in Speech Recognition: The Shared Views of Four Research Groups. In IEEE Signal Processing Magazine, Oct. 15, 2012.
I. Hubara, M. Courbariaux, D. Soudry, R. El-Yaniv, and Y. Bengio. Quantized Neural Networks: Training Neural Networks with Low Precision Weights and Activations. arXiv: 16090706, Sep. 22, 2016.
S. Ioffe and C. Szegedy. Batch Normalization: Accelerating Deep Network Training by Reducing Internal Covariate Shift. In ICML, 2015.
N. S. Keskar, D. Mudigere, J. Nocedal, M. Smelyanskiy, and P.T.P. Tang. On Large-Batch Training for Deep Learning: Generalization Gap and Sharp Minima. In ICLR, 2017.
A. Krizhevsky. One Weird Trick for Parallelizing Convolutional Neural Networks. arXiv:1404.5997v2, Apr. 29, 2014.
A. Krizhevsky. I. Sutskever, and G. Hinton. ImageNet Classification with Deep Convolutional Neural Nets. In NIPS, 2012.
Y. LeCun, B. Boser, J. S. Denker, D. Henderson, R. E. Howard, W. Hubbard, and L. D. Jackel. Backpropagation Applied to Handwritten Zip Code Recognition. In Neural Computation, 1989.
K. Lee. Introducing Big Basin: Our Next-Generation AI Hardware. https://code.facebook.com/posts/1835166200089399/introducing-big-basin, Mar. 8, 2017.
T.-Y Lin, P. Dollár, R. Girshick, K. He, B. Hariharan, and S. Belongie. Feature Pyramid Networks for Object Detection. In CVPR, 2017.
T.-Y Lin, M. Marie, S. Belongie, J. Hays, P. Perona, D. Ramanan, P. Dollár, and C.L. Zitnick. Microsoft COCO: Common Objects in Context. In ECCV, 2014.
J. Long, E. Shelhamer, and T. Darrell. Fully Convolutional Networks for Semantic Segmentation. In CVPR, 2015.
Y. Nesterov. Introductory Lectures on Convex Optimization: A Base Course. Springer Science + Business Media, 2004.
R. Rabenseifner. Optimization of Collective Reduction Operations. In ICCS. Springer, 2004.
S. Ren, K. He, R. Girshick, and J. Sun. Faster R-CNN: Towards Real-Time Object Detection with Region Proposal Networks. In NIPS, 2015.
H. Robbins and S. Monro. A Stochastic Approximation Method. *The annals of mathematical statistics*, 1951.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet Large Scale Visual Recognition Challenge. IJCV, Apr. 11, 2015.
P. Sermanet, D. Eigen, X. Zhang, M. Mathieu, R. Gergus, and Y. LeCun. Overfeat: Integrated Recognition, Localization and Detection Using Convolutional Networks. In arXiv:1312.6229v4, Feb. 24, 2014.
K. Simonyan and A. Zisserman. Very Deep Convolutional Networks for Large-Scale Image Recognition. In arXiv:1409.1556v6, Apr. 10, 2015.
C. Szegedy, W. Liu, Y. Jia, P. Sermanet, S. Reed, D. Anguelov, D. Erhan,V. Vanhoucke, A. Rabinovich. Going Deeper with Convolutions. In CVPR, 2015.
R. Thakur, R. Rabenseifner, and W. Gropp. Optimization of Collective Communication Operations in MPICH. In IJHPCA, 2005.
Y. Wu, M. Schuster, Z. Chen, Q. V. Le, M. Norouzi, W. Macherey, M. Krikun, Y. Cao, Q. Gao, K. Macherey, et al. Google's Neural Machine Translation System: Bridging the Gap between Human and Machine Translation. arXiv:1609.08144v2, Oct. 8, 2016.
Xie, R. Girshick, P. Dollár, Z. Tu, and K. He. Aggregated Residual Transformations for Deep Neural Networks. In CVPR, 2017.
W. Xiong, J. Droppo, X. Huang, F. Seide, M. Seltzer, A. Stolcke, D. Yu, and G. Zweig. The Microsoft 2016 Conversational Speech Recognition System. arXiv: 1609.03528, Sep. 12, 2016.
M. D. Zeiler and R. Fergus. Visualizing and Understanding Convolutional Networks. In ECCV, 2014.

\* cited by examiner

DISTRIBUTED TRAINING AND PREDICTION USING ELASTIC RESOURCES

TECHNICAL FIELD

This disclosure generally relates to machine learning (ML) models, such as neural networks (NN), and methods/systems for training the ML models.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may use a machine learning model to identify content or messages of interest to the user based on various criteria/input sources, such as for example, a user's input, a user's profile, a user's social graph (described below), etc. The social-networking system may send over one or more networks the content or messages, which may be related to its services, to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a master machine learning (ML) control system/server (e.g., a scheduler machine or master ML control system, or first computing system) establishes access to different types of computing systems configured for different types of primary tasks. Such systems may include, for example, a GPU-based or CPU-based ML training system (e.g., a second computing system) designated for training ML models, and a CPU-based execution system/service server (e.g., third computing system) configured for performing one or more primary tasks, such as handling HTTP requests (e.g., a web server), executing an already trained ML model, or performing any other tasks or services. The ML training system may be optimized for training a specific ML model based on operations needed for training the specific ML model (e.g., have large memory bandwidth and large memory capacity for handling matrix joining operations, such as matrix multiplication, transformation, etc., have many processing cores for parallel training of multiple neural network (NN) model paths, support deep processing threads for processing a deep NN model, etc.). Thus, the ML training system may be architecturally different from the execution system, which may be a CPU-based, general purpose computer. For example, the ML training system and the execution system may differ in their type of general purpose processor (e.g., GPGPU vs. CPU), in their supported memory bandwidth, in the depth of their parallel threads, in the size/speed of level-1 cache available to their processing core(s), in their number of processing cores, in their processing clock speed, etc. Nevertheless, available processing bandwidth in both types of systems may be utilized for ML training. As an example, the ML control system may assign an ML model for training to a ML training system, which may be configured to create a check-point in response to a first predefined triggering event, such as: an instruction from the ML control system; completion of a certain number of training epochs (or reaching a specified execution point within an epoch) in the training of the ML model; the approach of a predefined time of day; a predefined other computing system becoming available; or a need for the ML training system to be used for different purposes. The check-point may be a record of an execution state (e.g., a current execution state at the time the check-point is recorded) in the training of the ML model by the ML training system. The ML control system may respond to a second predefined triggering event (e.g., the approach of a predefined time of day, a predefined other computing system becoming available, or a need for the ML training system to be used for different purposes) by halting the training of the ML model on the ML training system. The ML control system may then assign to an available execution system (or another ML training system) the ML model for training, continuing at the execution state recorded by the check-point, in response to a third predefined triggering event (e.g., determining that the execution system or collective group of execution systems are suitable for training the ML model, determining that the execution system or the group of execution systems may be able to meet a service-level agreement associated with the ML model, determining that the execution system or the group of execution systems have become available). Various hyper-parameters for the training of the ML model may be adjusted to assure that the continued training of the ML model on the subsequent system (e.g., ML training system(s) or execution system(s)) does not drift more than a specified margin from training results that would have been obtained had training not been interrupted.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
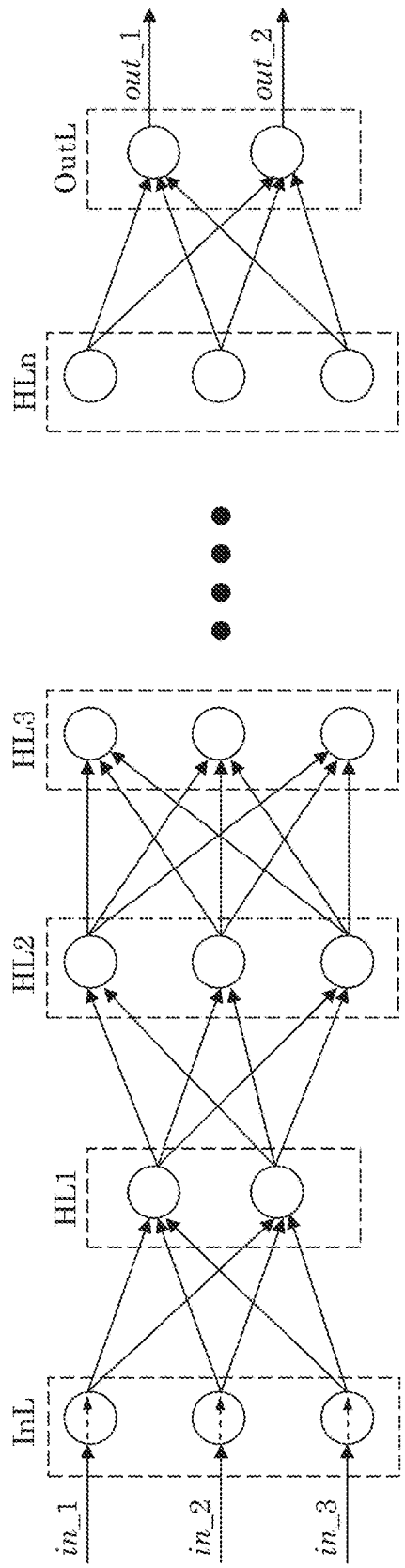
FIG. 1 illustrates an example of a multilayer perception (MLP) neural network.

In particular embodiments, a method and system are presented for transferring the training of a machine learning (ML) model (e.g., a neural network (NN) model) at a check-point (e.g., a stored intermediate processing point in the training process) to different computing machines with potentially differing computer architectures, resources, or characteristics, (e.g., GPU-based vs. CPU-based, having differing memory capacity or bandwidth, having different number of processing cores, etc.). At times, there may not be enough machine-training computing resources to meet a service-level agreement (SLA) for training an ML model. In particular embodiments, at such times, a service computing machine, or ML execution system, (e.g., user-facing web server(s), which may include backend prediction system(s), that typically run already trained ML models to provide services, such as generating predications to users/clients) may be used, when available. Typically, service computing machines may be characterized by peak hours when they are busy providing services, and off-peak hours when they are underutilized and could be made available for other services, such as training an ML model.

In particular embodiments, the present method and system may provide a training architecture capable of selectively transferring the training of an ML model at an intermediate processing point in its training (e.g., a check-point) from one machine (e.g., a training machine) having a first computer architecture or resource to one or more other arbitrary machines (e.g., service computing machines) having different architectures or resources. A difficulty may arise due to machine learning models, such as neural network (NN) models, being characterized by what may be termed "machine learning aware execution," meaning that a machine learning model may be optimized for a specific machine architecture and its solutions (or progress in updating parameter weights or its capacity to converge to a solution) may be dependent upon the computing architecture/characteristics of the machine on which it is trained. For example, a training machine may have a GPU-based architecture, but a service machine may have a CPU-based architecture with different processing and memory resources than the GPU-based machine. Therefore, when transferring the training of an ML model from a GPU-based training machine at an intermediate point in the training process (e.g., at a check-point) to a CPU-based service machine, differences in machine characteristics may cause incompatibility with the training process and alter the training progress and/or results.

In particular embodiments, the present method and system may make use of service computing machines during their off-peak hours for training a machine learning model. That is, in particular embodiments, the present method and system may provide for heterogeneous computing for training a machine learning model across different computing systems having different computer architectures/characteristics.

Check-points may be determined during the training of a machine learning model and irrespective of the type of machine(s) on which the machine learning model is being trained. A check-point (e.g., on operation state, which may include, for example, an iteration number, weight parameter values, intermediate calculation values, etc.) may record sufficient information to resume the training process at a later time (or on a different machine) continuing from the check-point, as if training were (temporarily) halted at a point in time following the recording of the check-point. Additionally, the check-point may include information regarding the architectural characteristics of the computing system (which may include one or more computing machines) on which the machine learning model is being trained. For example, if training of the ML model were halted on a first computing system having a first computer architecture (or a first number of computing machines), then training of the same machine learning model may be transferred to a second computing system having a second computer architecture (or second number of computing machines) different than the first computer architecture (or first number of computing machines), and resumed at a specified check-point (e.g., at the most current check-point).

Check-points may be recorded at different times/execution points, as determined by different triggering events. Irrespective of the event trigger, when it is determined that a check-point should be created, a current training process may be permitted to continue until a safe point in the graph model of the current ML model is reached before recording a check-point. The safe point may be defined as the end of, e.g., one epoch, the training of the current back propagation iteration or update cycle/iteration, or when all intermediate parameters have known values.

A check-point may be recorded at a regular time interval or at a regular number of training cycles (e.g., epochs, update cycles or iterations, etc.). For example, if a check-point requires a large amount of information to be stored, then it may be desirable to extend a time between check-point recordings. Alternatively, if the training of a particular ML model (or portion of a ML model, e.g., graph-segment) is very process-intensive or time consuming, then the number of check-points may be increased for this particular ML model or portion of the ML model. Further alternatively, a check-point may be recorded in preparation for halting execution on a given machine, or computing system (and transferring execution onto a different machine, or computing system).

In particular embodiments, a scheduler machine (or master ML control system) may be in charge of transferring the training of ML models across multiple different computing machines. For example, the scheduler machine may routinely audit available computing resources and selectively transfer the training of a particular machine learning model from one machine to a second, faster machine or to a machine whose computer architecture is more closely aligned with the computing requirements of the particular ML model. For example, if the scheduler detects that a peak-usage period for a machine, or system, on which an ML model is being trained is approaching or has occurred, the scheduler may instruct the machine to save the current state of the ML training at a check-point and assign the training task to another machine that is available.

In particular embodiments, the scheduler machine may distribute execution of a single machine learning model across multiple different computing machines, so that each computing machine trains a different portion (e.g., graph-segment) of the ML model and the different computing machines exchange processing data, as needed. In this case, the scheduler machine may monitor the performance of each computing machine, and if necessary, transfer execution of a portion of the machine learning model from one machine to a faster or slower machine, as necessary, to maintain optimal timing between the transferring of processing data between the machines (e.g., to minimize wait time by one machine waiting for another machine to reach a point where a check-point may be created or to complete transferring of processing data).

In particular embodiments, check-points recorded on different computing systems may be saved to one or more designated storage locations remote from the computing machines on which machine learning models are being trained.

In particular embodiments, various hyper-parameters, or ML-training execution parameters (e.g., execution-settings for training a machine learning model that may be initialized prior to commencing the training of the machine learning model), that affect consistency of processing results (or intermediate processing results) across different computer architectures may be adjusted to assure consistency of training results (e.g., results having a similar accuracy within a predefined percentage value as if training were continued uninterrupted on a single system). The scheduler machine may also note the computer architecture of a first system (e.g., the number of computing machines or CPUs or GPUs) on which an ML model is being trained, and when transferring the training processing of the ML model to a second system having a computer architecture different than the first system, the scheduler machine may (automatically) adjust hyper-parameters for execution on the second system to assure consistency of training results with the first system.

The hyper-parameters may be adjusted based on computer system architecture. For example, if training of an ML model is based on (or a variant of) gradient descent (e.g., stochastic gradient descent) and the training was being executed on a GPU-based machine, when transferring the training of the ML model to multiple CPU-based machines, a batch size (e.g., a hyper-parameter) may be increased for the CPU-based machine(s) so that a larger amount of training data may be considered during each training iteration cycle. Another execution hyper-parameter that may be adjusted, within a specified range, is the learning rate for training the ML model. In particular embodiments, the amount of learning rate adjustment may be based on the amount of adjustment of the batch rate. In particular embodiments, the change in learning rate may be made incrementally on consecutive epochs (e.g., the change may be made from the initial unchanged learning rate to the final learning rate incrementally in given number of substantially equal increments, e.g., in five epochs).

Before discussing the present embodiments in detail, it may be beneficial to first provide some background information regarding neural network (NN), machine learning (ML) models in general. A neural network, or neural net, is a (nodal) network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

FIG. 1 illustrates an example of a multilayer perception (MLP) neural network. Its structure may include multiple hidden (e.g., internal) layers HL1 to HLn that map an input layer InL (that receives a set of inputs (or vector input) in_1 to in_3) to an output layer OutL that produces a set of outputs (or vector output), e.g., out_1 and out_2. Each layer may have any given number of nodes, which are herein illustratively shown as circles within each layer. In the present example, the first hidden layer HL1 has two nodes, while hidden layers HL2, HL3 and HLn each have three nodes. Generally, the deeper the MLP (e.g., the greater the number of hidden layers in the MLP), the greater its capacity to learn. The input layer InL receives a vector input (illustratively shown as a three-dimensional vector consisting of in_1, in_2 and in_3), and may apply the received vector input to the first hidden layer HL1 in the sequence of hidden layers. An output layer OutL receives the output from the last hidden layer, e.g., HLn, in the multilayer model, processes its inputs, and produces a vector output result (illustratively shown as a two-dimensional vector consisting of out_1 and out_2).

Typically, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function to its inputs to produce an output for that node. Nodes in hidden layers (e.g., learning layers) may apply the same (or a different) function to their respective input(s) to produce their respective output(s). Some nodes, however, such as the nodes in the input layer InL receive only one input and may be passive, meaning that they simply relay the values of their single input to their output(s), e.g., they provide a copy of their input to their output(s), as illustratively shown by dotted arrows within the nodes of input layer InL.

Figure 2:
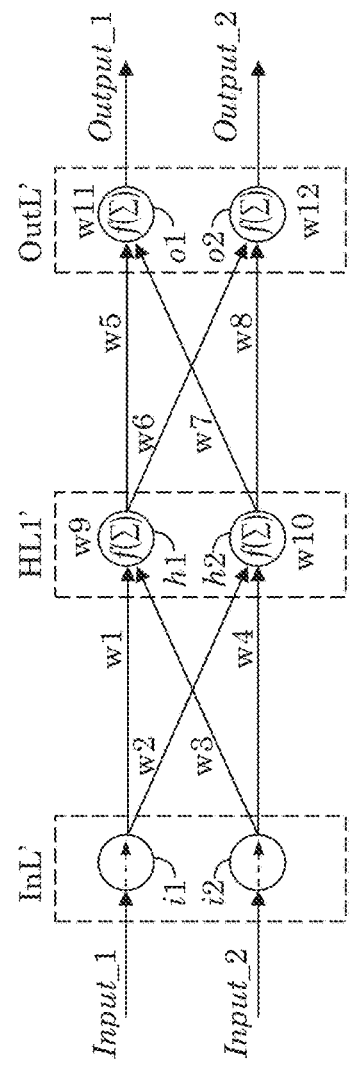
FIG. 2 shows a simplified neural network consisting of an input layer, a hidden layer, and an output layer.

For illustration purposes, FIG. 2 shows a simplified neural network consisting of an input layer InL', a hidden layer HL1', and an output layer OutL'. Input layer InL' is shown having two input nodes i1 and i2 that respectively receive inputs Input_1 and Input_2 (e.g., the input nodes of layer InL' receive an input vector of two dimensions). The input layer InL' feeds forward to one hidden layer HL1' having two nodes h1 and h2, which in turn are fed forward to an output layer OutL' of two nodes o1 and o2. Interconnections, or links, between neurons (illustrative shown as solid arrows) may have weights (e.g., w1 to w8) associated with them. Typically except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node (e.g., node weights w9, w10, w11, w12 respectively corresponding to nodes h1, h2, o1, and o2), and applying a function (e.g., non-linear or logarithmic) to the result. The non-linear function may be termed an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

During a training, or learning, stage, the neural net learns (e.g., is trained to determine) appropriate weight values to achieve a desired output for a given input. Before the neural net is trained, the weights may be individually assigned an initial (e.g., random and optionally non-zero) value. Various methods of assigning initial weights are known in the art. The weights are then trained (optimized) so that for a given training vector input, the neural network produces an output close to a desired (predetermined) training vector output. The desired output against which the current output is compared may be termed a label for the input data. A training vector input and its corresponding training vector output may be termed an input-output training pair, and a training data set may include multiple (e.g., tens to millions, or more) input-output training pairs. In this manner, the weights may be incrementally adjusted in thousands of iterative cycles, such as by a technique termed back-propagation.

Several back-propagation techniques are known in the art, including several based on gradient descent, such as batch gradient descent, stochastic gradient descent SGD (which may include mini-batch gradient descent), distributed synchronous and asynchronous SGD, elastic averaging stochastic gradient descent (EASGD), Hogwild, etc. EASGD may divide an ML model into a few parts/threads (each with its own local (weight) parameters). Each part may be assigned to a different concurrent process (e.g., processing thread or local worker) that maintains its own local parameters. A central master machine or processing block may maintain a master parameter list/set/store that is updated as a moving average over the local parameters computed by local workers. Because the local workers maintain their own local memory, their local parameters may develop elasticity, meaning that they may fluctuate further from the master parameter list. The idea is that EASGD may enable the local workers to perform more exploration, where the amount of elasticity/exploration is controlled by the amount of communication between the local worker and the central master machine (e.g., how often the local parameters are synchronized with the master parameter list). In Hogwild, multiple processors have access to a shared master parameter store without locking the shared master parameter store. This introduces the possibility of overwriting each other, but it has been shown that this approach may still converge to a solution for some types of machine-learning problems. Asynchronous SGD is a scalable method of distributing SGD across multiple processors. A basic approach of Asynchronous SGD may include dividing a full training data set into a number of training subsets, and using each training subset to train a separate copy (or portion) of an ML model. The multiple ML models communicate their respective parameter (weight) updates through a centralized parameter server (which keeps the current state of all parameters for the ML model, e.g., keeps the master parameter list), which may be sharded across many machines. That is, each machine that makes up the parameter server may hold a separate shard (piece or part) of the total master parameter list. For example, if one has 10 parameter server shards, each shard is responsible for storing and applying updates to ⅒th of the total ML model parameters (e.g., the master parameter list). In Synchronous SGD, the multiple ML models may wait until they are all finished processing their respective training subsets before synchronizing the results. In particular, after each node in each model generates a set of gradients for its model's parameters, the nodes engage in a collective communication phase to reduce the set of gradients and make the final result available on every node. The manner in which gradient descent training is carried out may differ. The differences may be, for example, in the fraction of the training data set that is processed through the ML model in a training cycle (e.g., from one training data unit, such as one input-output training pair, to 100 percent) to update a master parameter list/set (e.g., the weights of the ML model); in how the training set is distributed among multiple instances (or portions) of the ML model; in how often the master parameter list is updated with interim local parameter values, etc.

The different back-propagation techniques may differ in how specific features of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output.

In machine learning, an epoch typically refers to one complete pass (including back-propagation, if applicable) of the full training dataset to be learned through the machine-learning model. In one epoch, the full training dataset may be submitted to the learning algorithm in a single training iteration (in which case a "batch" of training data is used), or the full training dataset may be submitted in the aggregate after multiple training iterations, each using a subset (not including the whole set) of the training dataset (the subset of data used in each iteration may be referred to as a "mini-batch"). In batch SGD, the entire training dataset may be randomized and submitted to the ML model, but the master parameter set is not updated until the entire training set has been processed. At this point, an aggregate of the weight updates produced by the entire training set may be used to update the master parameters set. This may constitute one epoch in the sequence of training cycles. The entire training set may then be re-randomized and re-submitted to the ML model of another epoch (training) cycle. After each epoch cycle, gradient descent of the weights in the master parameters set may move toward their final values. Given the large size of typical training datasets, however, the feasibility of using batch SGD may often be limited by available memory size. As another example, in basic SGD, the entire training set may be randomized and individual input-output training pairs from the training set may be submitted to the ML model, one-by-one, for training. The master parameter set may be updated after each individual input-output training pair is processed by the ML model. In this case, after all the individual input-output training pairs in the training dataset have been processed, one epoch cycle could have completed. It is noted that, in this case, gradient descent of the master parameter set may be noisy (e.g., have up and down movements) prior to reaching their final value due to them being updated after each, individual input-out training pair. Basic SGD may be more eradicate, but may be faster for some types of machine-learning problems. Mini-batch SGD may be considered a compromise between batch gradient descent and basic SGD. In mini-batch SGD, a fraction (or mini-batch) of the whole training set is submitted though the ML model in each training iteration, and an aggregate of the interim weight values (e.g., parameters) produced by the mini-batch in that iteration is used to updating a master parameter (e.g., weight) set. Once all the mini-batches within a full training dataset have been submitted, one epoch cycle would be complete. Mini-batch SGD may typically make thousands of incremental changes to the weights over the course of an epoch, which may allow the machine-learning model to explore a wider space and converging to a better solution. As used herein, an "update cycle" may refer to the completion of a training process that resulted in the master parameter set being updated, irrespective of the number of input-output training pairs used in the training process (e.g., it could be a batch, a mini-batch, or a single training pair). In addition, as used herein, a "batch size" may refer to the size of a batch or a mini-batch.

Construction of a neural network model (or machine-learning model in general) may include a learning stage (which may also be referred to as a classification stage) and a classification stage (which may also be referred to as an operational, execution, or service stage). In the learning stage, the neural network may be trained for a specific purpose and may be provided with a set of training examples, including training inputs and training outputs (e.g., input-output training pairs), and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network (such as discussed above) may be made capable of approximating any measurable function to any desired degree of accuracy. The result of the learning stage is a machine learning model that has been trained. In the classification stage, an input with unknown outputs may be submitted to the trained machine learning model (e.g., to a service server executing the trained ML model), which may apply what has been learned to process the input to produce an output prediction. In this manner, a machine learning model may be part of a ranking and recommendation (neural network) framework, and be trained to provide a personalized experience for various service products, such as Ads Ranking, Feeds Ranking, Networking Services that prioritize items for sharing among users, Explore Services that identify items (e.g., pictures, videos, and articles) similar to items a user has previously liked, etc.

For ease of illustration, some features of a neural network framework may be disclosed herein within the context of practical example implementations. Due to real-world hardware limitations, neural networks may have practical size limits. For example, ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware (e.g., computing system) used to train an ML model be tailored to the ML model itself and that all training be done on the same computing system. At times, computing system used to train an ML model may include fast computing devices optimized for computational capacity and remote memory banks (e.g., parameter servers) that may hold interim parameter (e.g., weight) values.

Computing systems and system configurations may be tailored not only for particular types of machine learning models and training algorithms, but also for the types of data the machine learning model is designed to process. For example, machine learning models may receive different types of inputs (or features), such as dense inputs (which are typically long vectors), sparse inputs (which typically make use of embedding matrices, as described below), or a combination of both. Dense feature vectors may be used to represent dense inputs and sparse feature vectors may be used to represent sparse inputs.

A dense feature vector (e.g., dense input) may be represented by a mostly-populated vector (e.g., a vector having mostly non-zero entries/cells). A common example of dense feature vector is image data. As another example, a dense feature vector may include determinable descriptors common to or determinable for most users (or circumstances, depending upon the specific application) and often gleaned from multiple sources. For examples, dense features may include a user's gender, country-of-origin, time-of-day, local Wi-Fi status, user-educational-background, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types (e.g., signal/value sources) that together may characterize (e.g., describe or represent) a user (or circumstance), a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies (e.g., populated by IDs of) selections within a larger list(s) of options (lists may further be divided/grouped into different categories). This may be the case when the list of IDs that comprises the sparse input identifies individual selections from a larger list of options (such as provided by the dense vector). For example, a sparse input may be a list of webpage IDs indicating which webpages (from within a larger category list of webpages) a user has visited within a predefined time frame, or has commented on, liked, or has otherwise interacted with. In this case, the sparse (vector) input may have a separate cell (or group of cells) for each possible selection, and it may be populated by assigning a zero value to each not-selected option and assigning a non-zero value (e.g., numeral "1") to each selected option. As a result, a sparse vector may be characterized by having mostly zero entries, and a few non-zero entries. Consequently, a sparse vector may be represented as a series of indexes pointing to select cell positions (those having non-zero values) in the larger list along with each index's corresponding non-zero value for that position, with the understanding that all other positions not identified by index have a default zero value. Additionally, sparse inputs may not necessarily be directly descriptive of a user (or circumstance), but may instead provide auxiliary information indirectly related to the user (or circumstance). For example, webpages may have a list of associated advertisements (e.g., ads posted by a webpage provider). While one sparse input may reflect the individual webpages visited by a user, another (related) sparse input may provide more semantic information and reflect the ads (selected from among a larger list of ads) that are associated with (e.g., available to) the individually visited webpages. Training data may indicate which associated ads a training user selected (clicked on), and the neural network model may learn to predict what is the probability of a test user (that is similar to the training user, such as determined from the training user's user-descriptive dense input and the test user's corresponding dense input) selecting the same (or a similar/related) ad.

Typically, because of their many zero-entry cells, sparse vectors may not be well-suited for direct input to a neural network. To place them in a form better suited for a neural network, sparse inputs may first be converted to low-dimensional (and dense) representations (e.g., vectors having fewer, but mostly non-zero, entries/cells). An example of this type of low-dimensional conversion by use of embedding matrices is provided below.

Figure 3:
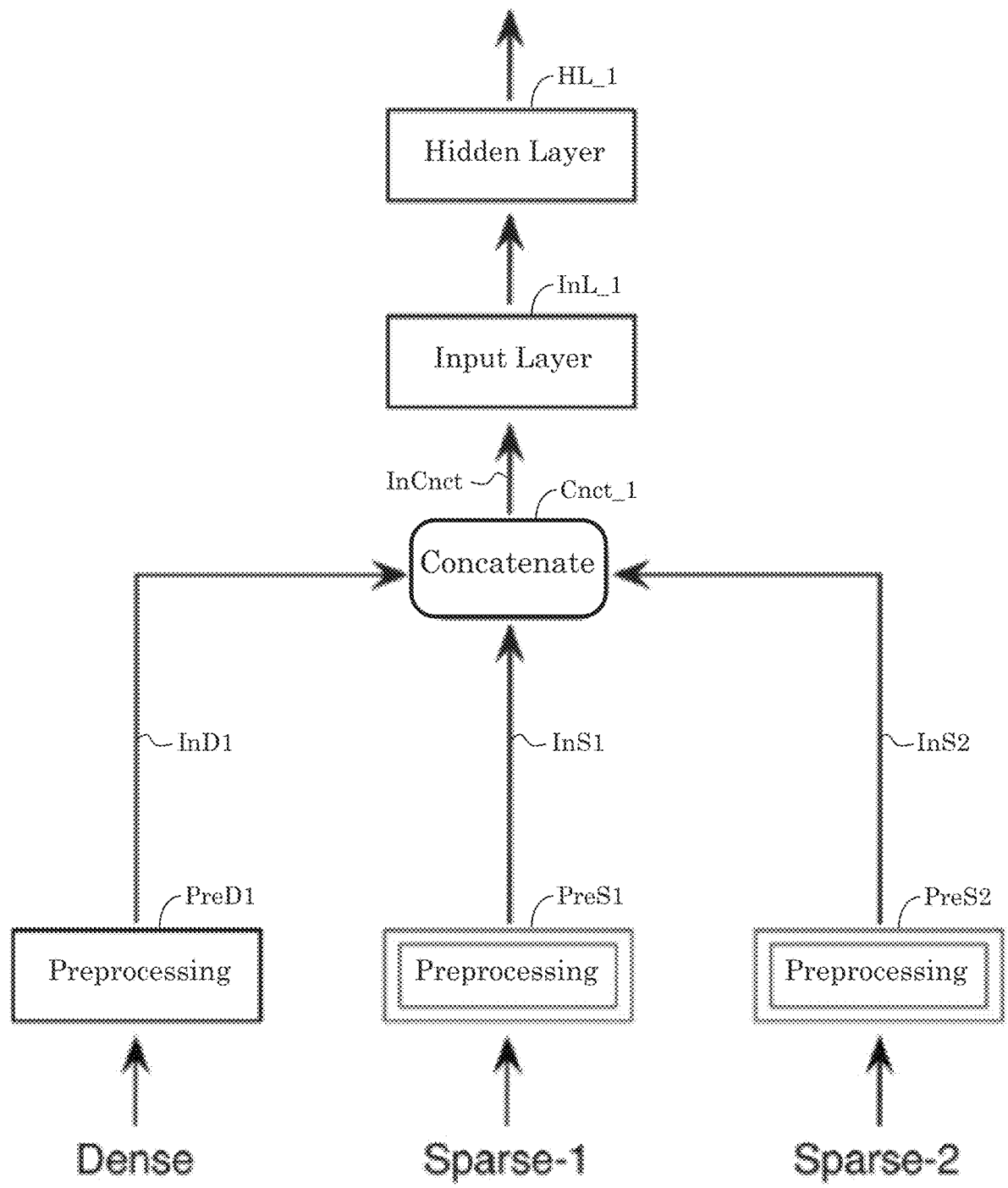
FIG. 3 illustrates a method of combining a one or more dense input and one or more sparse input in a neural net.

FIG. 3 illustrates a method of combining one or more dense input and one or more sparse input in a neural network. In the present example, preprocessing blocks PreD1, PreS1, and PreS2 may configure their respective inputs into formats better suited for a neural network. In the present example, preprocessing block PreD1 may be passive, meaning that it may convey its received input to its output without modification. For example, input "Dense" may be a dense (vector) input that is already in proper format for a neural network (e.g., it may have mostly non-zero entries), and preprocessing block PreD1 may recondition (e.g., boost/sharpen signal shapes) of input Dense to define (as intermediate output of block PreD1) input InD1 to combining (or concatenation) block Cnct_1. That is, multiple inputs (e.g., dense and sparse) may be combined by concatenation, other suitable vector-combining method (e.g., a similarity measure between sets (e.g., pairs) of vector inputs), or a combination of these.

As is explained above, however, sparse vectors, such as inputs Sparse-1 and Sparse-2, may have a large proportion of zero entries, and thus may not be optimally configured for a neural network. Preprocessing blocks PreS1 and PreS2 may convert their respective sparse inputs, "Sparse-1" and "Sparse-2," to corresponding low-dimensional vector representations, InS1 and InS2, (e.g., low dimensional dense vectors, e.g., vectors having a few (e.g., 32) mostly non-zero entries/cells). Preprocessing blocks PreS1 and PreS2 may apply the same preprocessing to their respective sparse vector inputs, Sparse-1 and Sparse-2, or preprocessing block PreS1 may preprocess Sparse-1 differently than block PreS2 preprocesses Sparse-2. Optionally, preprocessing blocks PreS1 and PreS2 may both implement a low-dimensional conversion/transformation, such as by use of an embedding mechanism/process.

In the present example, intermediate signal InD1 may be directly concatenated with intermediate signal InS1 and InS2, the low-dimensional representations of corresponding sparse inputs Sparse-1 and Sparse-2. For example, Concatenation block Cnct_1 may directly append its inputs InS1 and InS2 to the end of its input InD1. The resultant concatenated input InCnct may then be applied to an MLP neural network (or other ML model) in a manner similar to that described above. That is, input InCnct may be applied to a first input layer InL_1, which in turn may relay it to a first hidden layer HL_1 in a series of hidden layers of an MLP neural network.

In particular embodiments, preprocessing blocks PreS1 and PreS2 may convert their respective sparse inputs, Sparse-1 and Sparse-2, to corresponding low-dimensional representations (e.g., latent vector representations), InS1 and InS2, by applying an embedding process (or graph embedding), which may use a corresponding embedding matrix for each category of entity or item that is represented by sparse inputs. That is, a sparse input, Sparse-1 or Sparse-2, may include a list of IDs, where each ID may identify a non-zero entry in the sparse input. In preprocessing, each ID in the sparse vector may be replaced by (or otherwise converted to) an embedding (e.g., a low-dimensional feature (dense) vector) that conveys a semantic meaning to that ID. Determination of the conveyed semantic meaning, and thus the embedding, is dependent upon how the neural network is trained. That is, the embedding matrices may be comprised of feature weights (e.g., parameters), and the embedding matrices and other parameters (e.g., link weights and node weights) of the neural network (ML model) may be learned jointly by back-propagation, or other suitable neural network training process.

In general, graph embedding aims to embed a graph into a Euclidean space so that each node in the graph has a coordinate. There are various graph embedding algorithms known in the art, and typically they differ in what properties one wishes to be preserved during the embedding. For example, Isomap is a nonlinear dimensionality reduction method that embeds the graph that most faithfully preserves the shortest distance between any two nodes in the graph, while Laplacian Eigenmaps is a method that preserves proximity relations, mapping nearby input nodes to nearby outputs, and Maximum Variance Unfolding aims to map high dimensional data points to low dimensional embeddings while preserving certain properties about the manifold during the embedding. Irrespective of the graph embedding method, the obtained embeddings may be used in a wide range of applications such as visualization, classification or heuristic searches. That is, embedding an entity results in a vector representation of that entity within the defined vector space, which permits semantic or heuristic meaning to be extracted from different entities based on their embeddings within the defined vector space (e.g., their vector relationships within the defined vector space).

Figure 4:
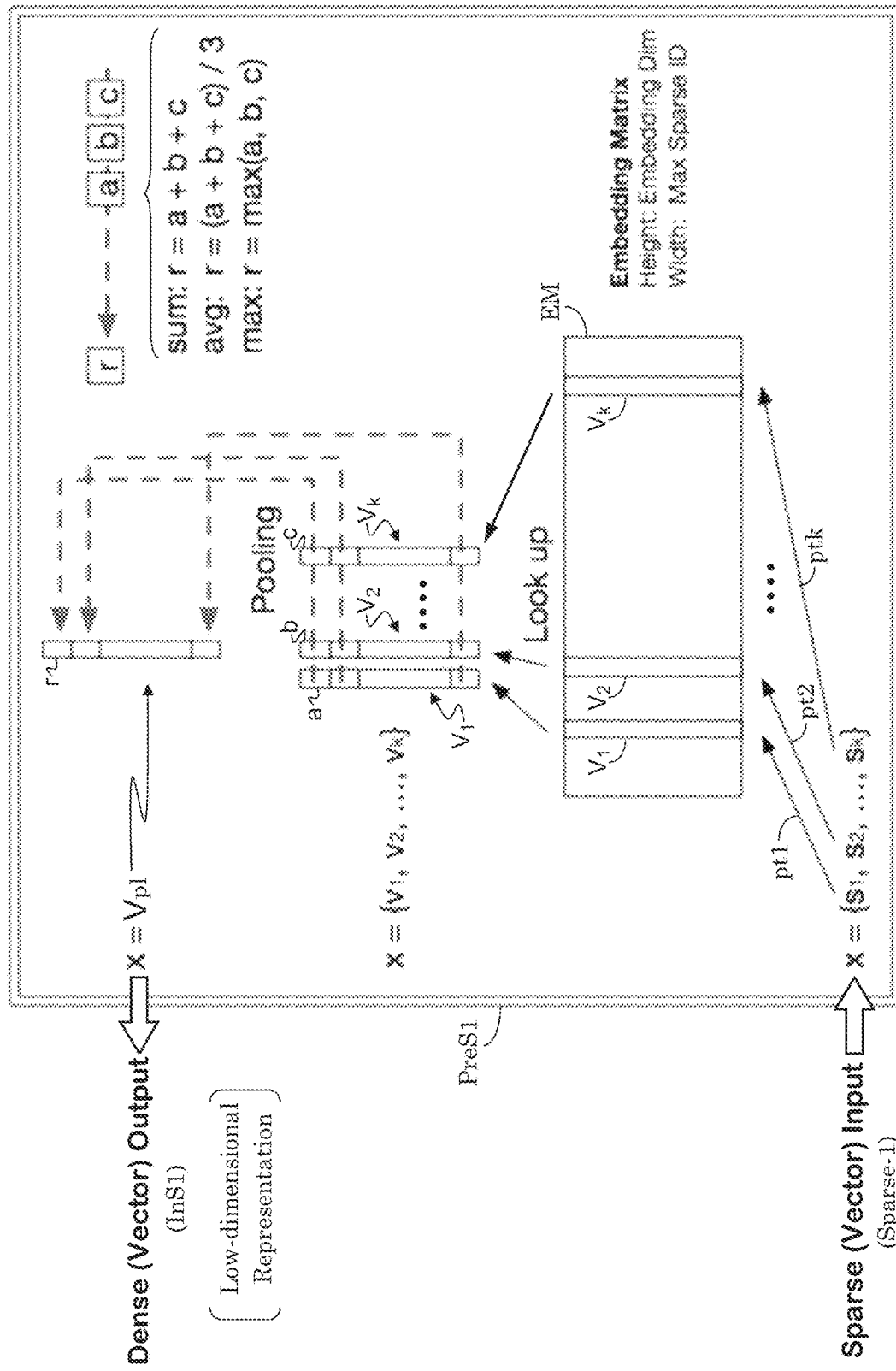
FIG. 4 illustrates an example embedding and pooling technique.

FIG. 4 illustrates an example embedding and pooling technique. Optionally, preprocessing blocks PreS1 and PreS2 of FIG. 3 may each implement the embedding and pooling technique of FIG. 4 to convert their respective sparse input, Sparse-1 or Sparse-2, to corresponding low-dimensional representation, InS1 or InS2. For ease of discussion, the EP block of FIG. 4 is shown as being implemented by preprocessing block PreS1, but it is to be understood that the same EP block may likewise be implemented by preprocessing block PreS2.

In the present example, the input to PreS1 is illustratively shown receiving a sparse (vector) input (e.g., Sparse-1). In particular embodiments, a preprocessing block PreS1 or PreS2 may alternately receive a dense vector. As is explained above, sparse inputs may be used to represent category information related to a user, or circumstance, such as visited webpages, frequency of webpage visits, clicked advertisements, submitted preferences, etc. Thus the present approach provides for category embedding, and thereby can provide insight into category similarities. That is, with embedding, similar categories may be mapped to nearby regions in the resultant embedding space. The model learns a numerical embedding (e.g., parameter weights) for each category of a categorical feature, based on all categories in the embedding space, which permits visualization of relationships between categories and thus permits extraction of similarity-knowledge between categories based on geographic relationships within the embedding space.

As is also explained above, a sparse vector may include a series of indexes pointing to selections from a larger list, and each index's assigned value. In the present case, input Sparse-1 (relabeled as generic indicator "X" within preprocessing block PreS1) may include a list of IDs, which are illustratively identified as a series of "k" IDs: $S_1, S_2, \ldots, S_k$. In the present case, each ID entry may include a corresponding pointer index (pt1, pt2, ..., ptk) pointing to a selection option, or category, within an embedding matrix EM. The embedding matrix EM may assign a vector representation $(V_1, V_2, \ldots, V_k)$ of fixed dimension (e.g., 32 cells/dimensions in each vector representation). Consequently, embedding matrix EM may have a height equal to the embedding dimension (e.g., dimension size of assigned vector representations, e.g., 32 cells/dimensions long) and a width equal to the number of possible object/feature selections (e.g., the maximum number of available IDs to select from). After embedding, the series of IDs $(S_1, S_2, \ldots, S_k)$ of input "X" may each be individually replaced by a series embedding vector representations $(V_1, V_2, \ldots, V_k)$, such that after embedding, X may be defined as $X=\{V_1, V_2, \ldots, V_k\}$.

At this point, the embeddings $(V_1, V_2, \ldots, V_k)$ of the input IDs/features $(S_1, S_2, \ldots, S_k)$ may be submitted to an optional pooling stage, which may down-sample the multiple embeddings into a single representative vector. That is, the pooling stage may convert the series of embedding vector representations $(V_1, V_2, \ldots, V_k)$ into a single pooled vector, Vpl, having the same dimension as the embedding vector representations. In this manner, the pooling stage creates a single low-dimensional vector (e.g., Vpl) of the entire, original input Sparse-1. In effect, pooling reduces the amount of data flowing through a neural network (ML model), and may thereby decrease the computational cost of the neural network. Basically, pooling may be a way to define a compact representation of the input (e.g., Sparse-1) to the EP block by aggregating the embeddings (e.g., the embedding vector representations) of the input. It is noted that the input to embedding-and-pooling preprocessing block PreS1 may be a sparse input, a dense input, and be of any size (e.g., have any number of dimensions). For example, Sparse-1 may have any number of IDs in its lists of ID's.

The aggregating of the different embeddings may be achieved by applying an element-wise (dimension-wise) operation on corresponding elements of each embedding, as indicated by dotted lines in FIG. 4, to define the pooled vector Vpl. For ease of discussion, the present example may assume that input Sparse-1 has only three IDs in its list of IDs, e.g., it is assumed that "k" is 3 in FIG. 4. That is, the element-wise (e.g., bi-gram) pooling technique may be applied to top cell "a" of embedding $V_1$, to top cell "b" of embedding $V_2$, and to top cell "c" of embedding $V_k$ to define the top cell "r" of pooled vector Vpl. The same pooling technique may be applied element-wise on the next cell in the embedding vector representations, and so on until all cells of the embedding vector representations have been processed, and pooled vector Vpl fully defined. Multiple linear pooling techniques are known in the art, and FIG. 4 illustrates three optional techniques. That is, typical linear pooling techniques (operations) may include summation pooling (element-wise summation of the embeddings), average pooling (the element-wise averaging of the embeddings), or max pooling (taking the greatest element-wise value in the embeddings). Other pooling techniques may include geometric pooling and multiplicative pooling, but these pooling techniques may require additional computational resources.

As is described below, the present disclosure further provides for embedding of dense vector inputs along with sparse vector inputs. That is, dense inputs may also be submitted to an EP block, such as illustrated in FIG. 4, or other suitable EP architecture. For a dense vector, linear pooling (element-wise pooling, such as described above) may be used so that the EP block may be similar to a linear fully-connected layer. Embedding dense inputs along with sparse inputs in the construction of the embedding space may provide for more relational information between the two types of inputs.

After the ML model has been trained, the trained ML model may be submitted to a service server (e.g., a CPU-based machine or system used for day-to-day operational servicing of client users). Typically service servers may be of different types, which may refer to their specific generation, or primary use, or configuration, which may be characterized by different resource-emphases, such as computing capacity level or memory size. Service servers may be assigned tasks (running an ML model) based on their resources. Service servers may support different (client) products and services, such as adds, newsfeeds, searches, etc., and may also support internal services, such as database management. For example, a service server may be a ranking machine (e.g., a Facebook server), and execution of a trained ML model may identify candidate item(s) (among multiple available candidate items) that may be of most interest to a user. In particular embodiments, each trained ML model may consider a user input (or request) and one (or more) available candidate items as an information pair (more specifically, as a user/request-and-candidate item pair), and provide a prediction value (e.g., probability value) for this particular pair based on the ML model, which may then be compared with prediction values of other pairs to identify the optimal pair(s), which may be those having the highest prediction values. Therefore multiple instances of the trained ML model may be executed to consider multiple user/request-and-candidate item pairs to consider multiple candidate items, or to consider multiple candidate items for multiple different users. Additionally as explained above, some inputs may need embedding, and although the embeddings will have already been defined (e.g., embedding matrices will have been trained), large memory capacities may be needed to store the trained embedding matrices. As is also explained above, the user features (e.g., dense inputs) may be large and require high data processing capacity. Thus, assignment of a specific trained ML model to a specific service server type may be dependent upon how well the configuration of a service server type meets the processing requirements of the specific ML model.

In particular embodiments, computer processing of a trained (Sparse NN) ML model may be split between at least one local machine and at least one remote machine, over a computer network. The local machine, which may be a local ranking machine (e.g., a Facebook server), may be characterized by a computer architecture that emphasizes computational power over memory availability. The remote machine (e.g., another Facebook server), which may be a back-end service such as remote predictor (or a parameter server), may be characterized by a computer architecture that emphasizes memory storage capacity over computational power. In addition to differences in computational resources, the local machine and the remote machine may have access to different data sets (e.g., the local machine may have access to (e.g., receive as input) user features and the remote machine may have access to (e.g., store) trained embedding matrices). Output results of the remote machine may then be sent to the local machine, where they may be merged with outputs from the local machine according to the trained (Sparse NN) ML model.

Figure 5:
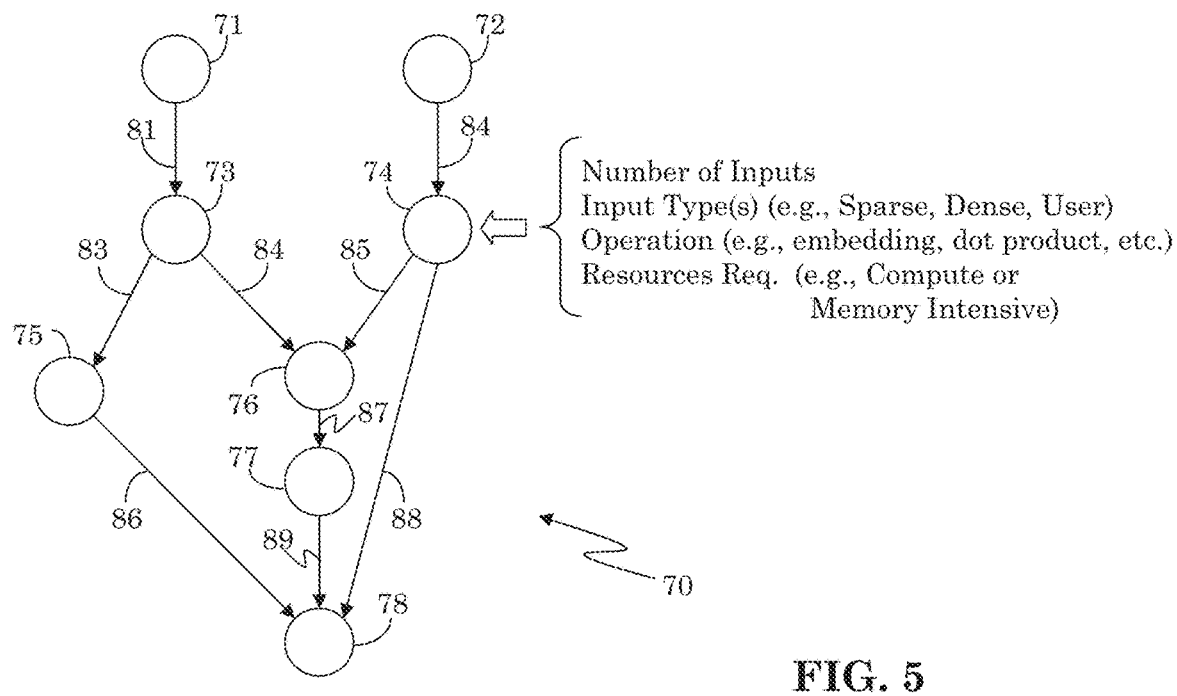
FIG. 5 illustrates an example, simplified, operation nodal model 70, e.g., a nodal graph model of a trained (NN) ML model.

FIG. 5 illustrates an example, simplified, operation nodal model 70, e.g., a nodal graph model of a trained (NN) ML model. After an ML model has been trained (such as described above), and the ML model parameters (e.g., weights/gradients) have been determined/learned, the trained ML model may be converted to one (or more) operational nodal model(s) 70. The operational nodal model 70 may break down the trained ML model into discrete operations sequences. Each operation (or optionally related group of operations) may be designated a node (e.g., 71 to 78) in an operational nodal model 70, with links (interconnections) (81 and 89) between nodes corresponding to operational relationships between operations of the neural network (e.g., indicating data transfers between nodes). As is illustrated, as an example, in regards to node 74, each node may identify its input count (number of inputs), input type(s) (e.g., dense feature, sparse feature, user-related feature, etc.), operation(s) it provides (e.g., embedding, dot product, mathematical operator, non-linear function, etc.), or needed operational resources (e.g., computation intensity level, expected memory usage level, etc.). The operation nodal model 70 may be segmented (e.g., split or divided) into multiple operation graph-segments.

Figure 6:
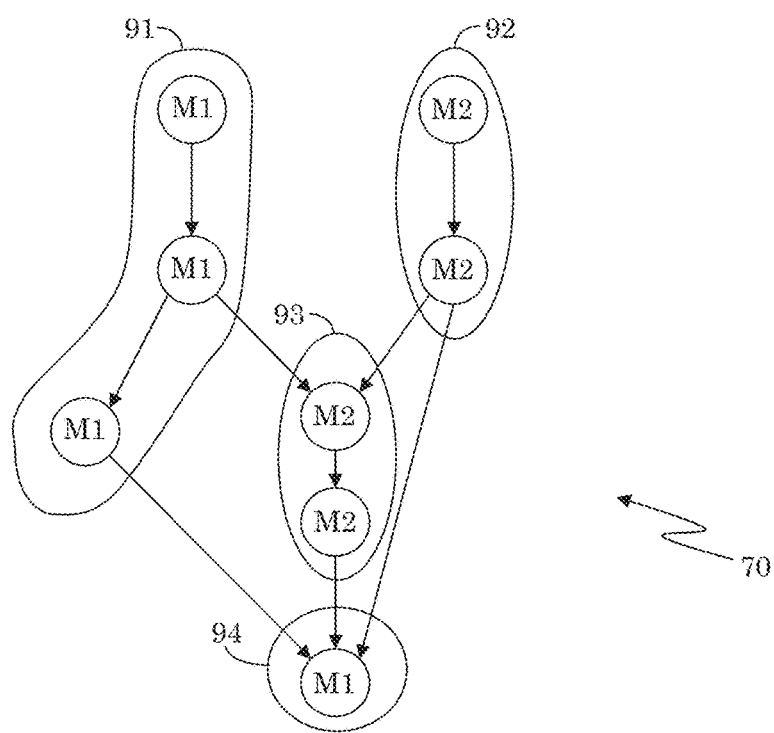
FIG. 6 illustrates, as an example, the operation nodal model 70 of FIG. 5 divided into multiple graph-segments.

FIG. 6 illustrates, as an example, the operation nodal model 70 of FIG. 5 divided into multiple graph-segments (91 to 94). Optionally, the graph-segments may be configured to be sufficiently self-contained so that each may be processed (executed) independent of each other, as much as practical. Individual graph-segments may be distributed (designated) for execution to specific machines (e.g., a computing system including multiple computing machines) that have the appropriate resources (e.g., high computational resources or high data storage resources or high memory bandwidth) for executing the individual graph-segments. For example, compute intensive graph-segments may be designated for processing within a first machine (as indicated by an "M1" node designation in FIG. 6), and memory-intensive graph-segments may be designated for processing on a second machine (as indicated by an "M2" node designation). Irrespective, the output results of executing graph segments on the first machine or second machine may be merged into a reconstruction of the graph representation of the original ML model 70, and a final result may be determined.

Machine designation of a node may be determined using any of several methods/systems/mechanisms. For example, an operational cost value of each node may be estimated, such as by means of a cost function, and the operational cost value may be used to determine whether a model graph node (or graph segment) receives a machine designation indicating preferred execution within one type of machine (e.g., having a higher computational capacity) or preferred execution within another type of machine (e.g., having a higher memory storage capacity). For example, a cost function may evaluate each node, or group of nodes, based on estimated computational requirements and memory usage, and thereby determine the type(s) of machine(s) to which it may be suited.

Returning to the topic of ML model training, typically general purpose graphic processing unit (GPGPU) machines (e.g., GPU machines) may be better suited for training than central processing unit (CPU) machines. That is, GPU machines may generally be used for the ML model training stage, and CPU machines may generally be used for executing already trained ML models (e.g., for the operational stage) and/or performing any other type of task or service. Some reasons for this is that general purpose GPUs generally have higher memory bandwidth. Furthermore, GPUs may have more processing cores, through which more threads may be concurrently processed. As such, even for a GPU that has higher memory latency than typical CPUs, its multi-threading capabilities may sufficiently compensate for the memory latency. For instance, while one group of threads waits for data from memory to be fetched, another group of threads may execute, so the GPU continues to be productive during memory latency. Additionally, because each processing core has its own bank of registers and level 1 memory, this may help GPU machines provide a larger onboard memory as an aggregate. These factors may make GPU machines better suited for large memory operations, such as matrix multiplication and convolution, which may be required as part of the training stage.

Figure 7:
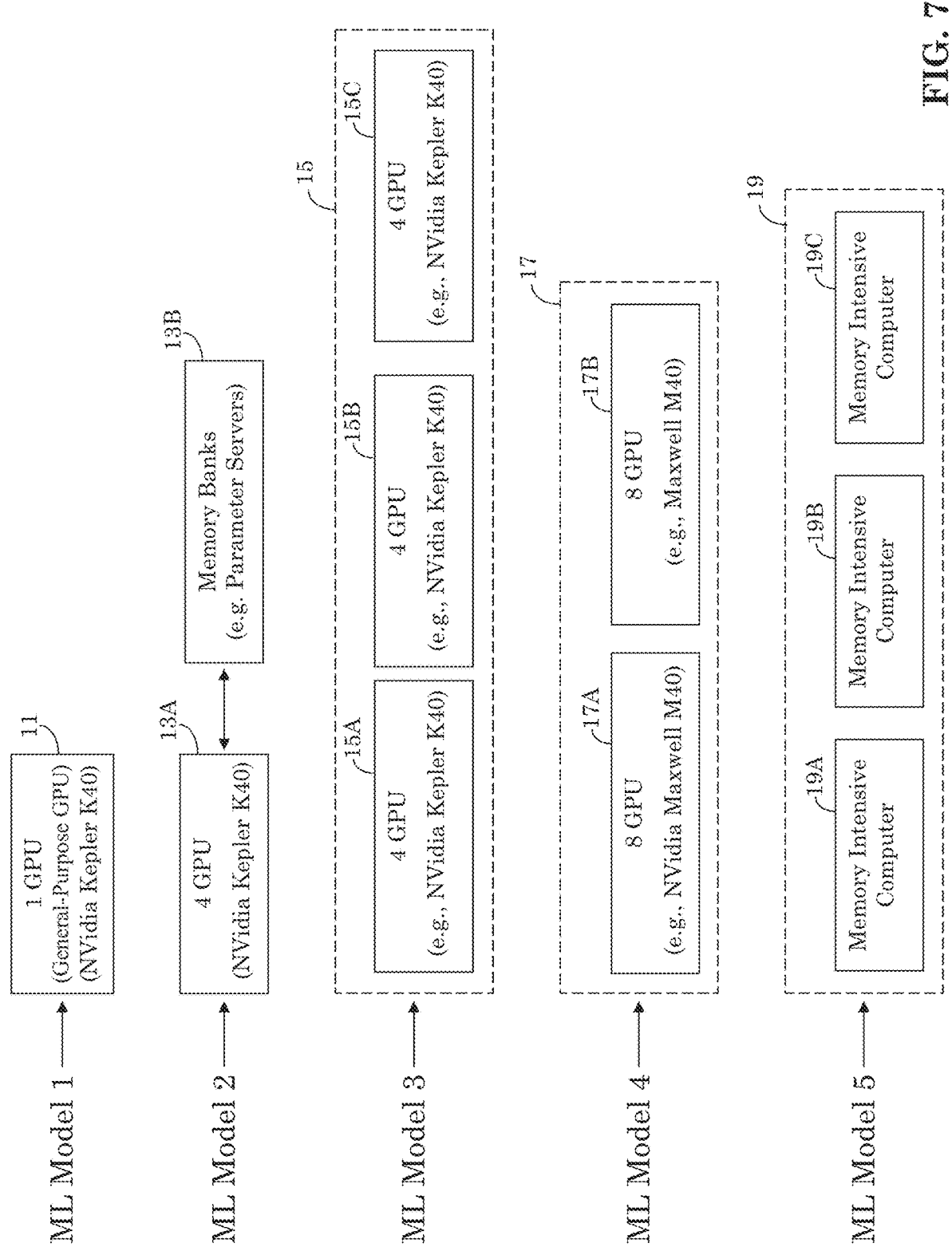
FIG. 7 illustrates some example training system configurations.

FIG. 7 illustrates some example training system configurations. For example, ML Model 1 is submitted to training system 11, which is illustratively shown as having one GPU (e.g., daughter board). More specifically, training system 11 has one NVidia Corporation, Kepler K40 GPU-based board, which has a total of 2880 single instruction multiple data (SIMD) cores (e.g., processing cores). As model complexity increases, it may be necessary to add more GPU boards to a machine or to increase the number of machines in a training system. For example, ML Model 2 is submitted to a training system consisting of GPU machine 13A, which has four GPUs, and a memory bank server 13B. As the amount of training data grows and ML models became more sophisticated, it may not be possible to train the ML model on a single machine. For example, ML Model 3 is submitted to a training system 15 made up of three GPU-based machines; 15A, 15B, and 15C. It is noted, however, that typically each model node in a neural network model (e.g., as described above in reference to FIGS. 1 and 2) needs to have consistent behavior, meaning that in the industry, the resource of each node (e.g., node in a hidden layer) may look very homogeneous, (e.g., all model nodes may be equal and processed in parallel in a very consistent manner). Therefore, all computing systems 15A, 15B, and 15C in training system 15 have identical (or substantially similar) configurations, e.g., all have four Nvidia Kepler K40 GPUs. If higher power is needed, then, additional GPUs or more powerful GPUs may be used. For example, ML Model 4 is submitted to a training system 17 consisting of two computing systems 17A and 17B, each system having 8 NVidia Maxwell M40 GPUs, where each M40 GPU has a 3072 SIMD cores. Irrespective of the training system configuration, heretofore, the industry has required that all servers be the same. For example, ML Model 5 is submitted to a training system 19, which includes three identical memory intensive computers 19A, 19B, and 19C. If for any reason the training of an ML model were to be paused on any training system, the industry heretofore has required that resumption of the ML model be limited to the same training system on which the ML was being trained prior to being paused.

A reason for training system homogeneity within the industry may be that in training, certain nodes (e.g., nodes within the same layer) may need to end at the same time and share/exchange data before continuing with subsequent layer/nodes within the neural network. Another reason for the industry's practice of training system homogeneity may be the close relationship between a neural network ML model, the specific back-propagation technique used to train the neural network ML model, and the hardware (e.g., the computing system on which the model is trained) which may have been tailored to the ML model, itself. That is, if training of a first ML model is started on a first computing system, then training of the first ML model is typically completed on the same first computing system. Typically, training of the first ML model would not be transferred from the first computing system to a second, different computing system. This would particularly be the case if the second computing system were substantially different than the first computing system (e.g., has a different computer architecture, such as a different type of processor unit or core, or a different computational capacity, or supports a different number of parallel processing pipelines, or has shorter/longer processing pipelines, or has a different memory capacity, or different processor speed, etc.). It is noted that when training an ML model, there is no guarantee that the neural network will converge to an answer. It may be necessary to try various hyper-parameters adjustments before the neural network converges to an answer. Hyper-parameters are initial execution-settings of the specific back-propagation technique (such as those based on gradient descent described above) that are set prior to the start of training of the neural network ML model. That is, different hyper-parameters of the training technique being used (e.g., SGD, distributed SGD, etc.) may be adjusted in a trial-and-error approach before identifying a set of hyper-parameters that permit the training of the ML model to converge to a solution. Since the adjusting of these hyper-parameters is determined for a specific training system, transferring the training of a neural network from one machine to a second machine may result in error since the hyper-parameters would have been tuned for the first machine and not for the second machine. That is, transferring the training of an ML model from a first computing system to a different second computing system may cause the training of the weight values (e.g., parameters) to deviate from their initial convergence path, which may introduce error, and the ML model may fail to converge to a solution, or may reach weight values substantially different than what the first computing system would have achieved, which may again introduce error. This deviation (or divergence) may further complicate any effort to combine interim results from the second computing systems with interim results from the first computing system, or any effort to transfer training of the ML model from the second computing system back to the first computing system. Nonetheless, not taking advantage of all available resources may be wasteful, and in particular embodiments, a system and method for training an ML model on non-homogenous training systems is herein provided.

Figure 8:
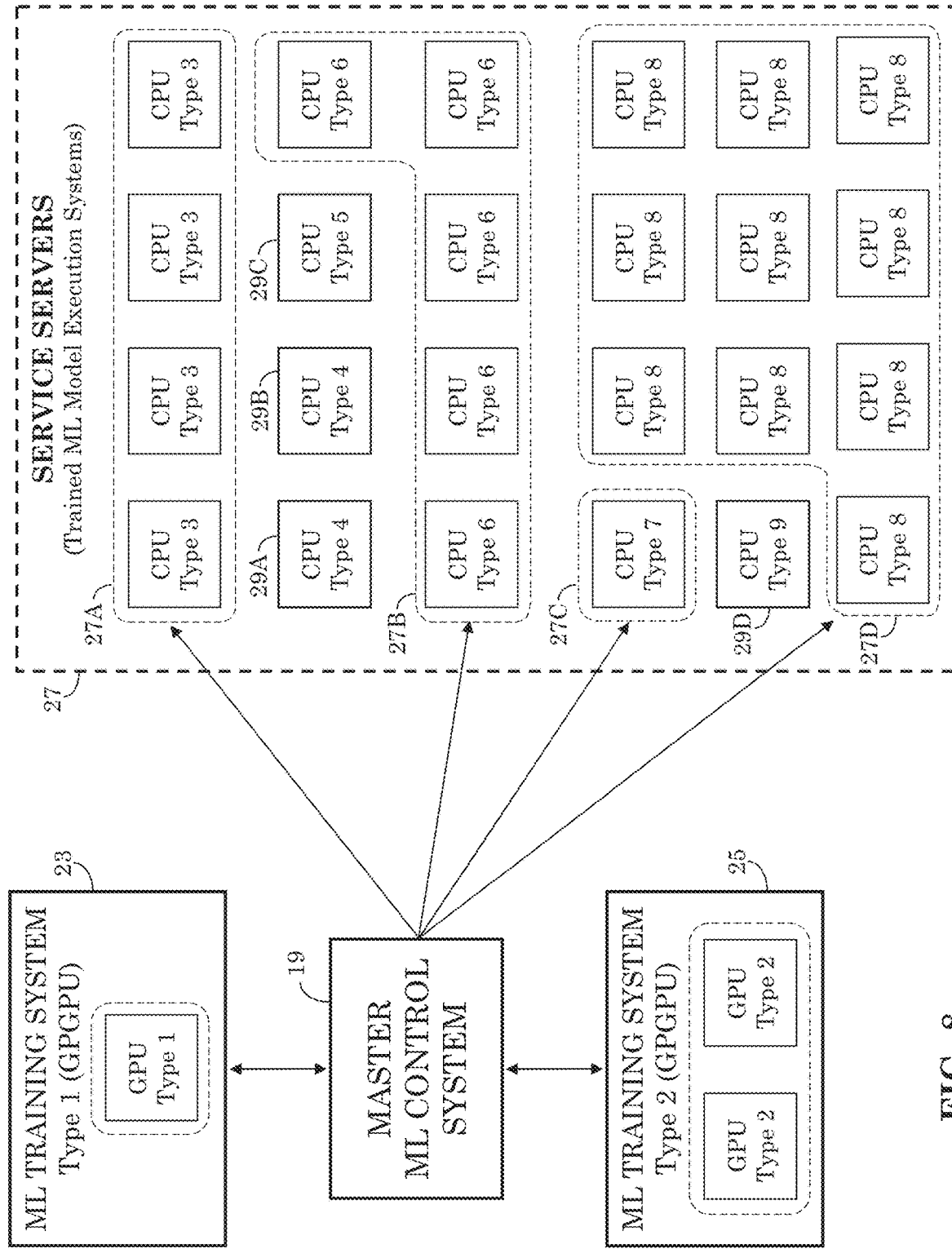
FIG. 8 illustrates an example computer network for transferring the training of a neural network ML model among multiple systems of different types.

FIG. 8 illustrates an example computer network for transferring the training of a neural network ML model among multiple systems of different types. A master ML control system (or scheduler machine) 21 monitors the training of multiple neural network ML models and available computing resources, and selectively distributes the training of individual neural network ML models across different machines in accordance with availability and scheduling demands. In the present example, master ML control system 21 may have access to two neural network training systems, 23 and 25, that are GPU-based and designed/optimized for training an ML model, as discussed above. Master ML control system 21 may further have access to a bank 27 of service servers, which may include multiple CPU-based service servers of different types and optimized for executing different primary tasks, such as handling HTTP requests (e.g., a web server), executing an already trained ML model, database management, or performing any other tasks or services. The bank 27 of service servers may, for example, be a bank of Facebook servers that provides services to online (e.g., Internet) client users (e.g., members of a social-networking system, as described below). For example, the service servers may provide different ranking and recommendation services based on live inputs, such as Ads Rankings services, Feeds Ranking services, networking services that prioritize items for sharing among users, explore services that identify items (e.g., pictures, videos, and articles) similar to items a client user has previously liked, etc. It is noted that because the bank 27 of service servers provides user services based on live inputs, it is characterized by peak hours when a peak number of client users are being serviced and by off-peak hours when substantially fewer client users are being services. For example, peak hours may correspond to times when more people (e.g., client users) are home from work or school and are online, and off peak hours may correspond to times when more people are asleep or at work or school and offline.

Optionally, master ML control system 21 may offload training of a neural network ML model to service servers during off peak hours when service servers may otherwise be idle or underutilized. However, not all service servers in bank 27 may be suitable for training a (particular) ML model. Master ML controller 21 may identify services servers suitable for training an ML model, and group different service servers by compatibility or "type" to define different training groups, e.g., groups 27A, 27B, 27C and 27D. As is explained above, a "type" category may refer to a specific generation of machine model, or primary use of the machine, or configuration (e.g., kind or number of processor core(s), computing capacity level, memory size, processing speed), etc. In the present example, individual services servers 29A, 29B, 29C, and 19D are rejected as not suitable for training an ML model, and not associated by any training group. Any number of computing systems (e.g., service servers) may be associated with a training group. For example, training group 27A may include four services servers categorized as type 3, training group 27B may include five services servers categorized as type 6, training group 27C may include only one service server categorized as type 7, and training group 27D may include ten services servers categorized as type 8. In the present example, the service servers within each training group may be of a similar type, but a training group may have services servers of different types in accordance with what may be needed for training a particular neural network ML model, or graph-segment of an ML model.

In particular embodiments, the Master ML control system 21 may manage the transferring of training a neural network model (or the distribution of substantially independent graph-segments of a neural network model) among multiple different machines/training groups (e.g., multiple computing systems). Each graph-segment (or distributed process) may be independent of others, so the load can be distributed heterogeneously. In this manner, part of a neural network model (e.g., graph-segment) may be offloaded to different machines (or training groups).

In order to better manage, or schedule, the transferring-of-training of a neural network ML model, each machine (or training group or computing system), may generate check-points at different times during the training of a neural network. The generation of checkpoints may be controlled by Master ML controller 21, or may be instigated by the machine (or training group of machines) that is training a neural network, in response to various triggering events, or conditions. A check point may be a record of an execution state in the training of a neural network (or graph-segment) with sufficient information to restart the training of the neural network (or graph-segment) at the execution state defined by the check point if for any reason the training were to be halted following the recording of the check point. For example, the check point may include a record of parameter (e.g., weight) values at the time when the check point is recorded (such as based on an operational nodal graph, or graph-segment, of the neural network model), an epoch or iteration number in the training of the neural network at the time when the check point is recorded, a record of hyper-parameter settings on the current machine (or training group), a description of the machine or training group (e.g., type, architecture, model, etc.) on which the neural network is being trained at the time when the check point is generated, a description of the first machine (or training group) on which training of the neural network was initially started and optionally a history of all other machines (or training groups) to which the training has been subsequently transferred, or hyper-parameter values used for training the neural network model (or graph-segment) on each machine (or training group) to which the neural network model (or graph-segment) has been transferred.

When transferring the training of a neural network ML model from a first machine (or training group) to a target machine (or target training group), the master ML control system 21 may instruct the first machine to cease its training operation (and optionally record a new check point), and indicate to the target machine, the neural network ML model being transferred and its (optionally most current) check point. The master ML control system 21 may indicate to the target machine (or target training group) where to acquire the neural network model and associated check-point, or may provide to the target machine the neural network model and associated check-point, or may have the first machine transfer to the target machine the neural network model and associated check-point. Irrespective, when the first machine (or training group) determines that it should record a check point (such as if it is instructed to do so by the master ML control system 21 or a check-point-triggering event occurs) the first machine may continue training the neural network (e.g., according to the operational nodal graph, or graph-segment, of the neural network model) until reaching a stable state, or finishing a current epoch or iteration cycle, or reaching a state where current calculations are finished. For example, the check point may be recorded when training reaches a predefined execution point in the operational nodal graph of the neural network, where the predefined execution point in the operational nodal graph may be an end of a current epoch or iteration of the operational nodal graph, finishing processing of a predefined layer of nodal operations within the operational nodal graph, or finishing processing (execution) of any nodes that were being executed at the time when a determination to record a check-point was made.

It is noted that the transferring of training a neural network model from one machine (or training group) to another is not a straight forward matter. Firstly, the training of different neural networks for different tasks is not the same. Some neural networks may be trained to discern attributes (e.g., patterns, relations, similarities, etc.) of text data, others of video data, others of audio data, others of image data, others of metadata, etc. Some neural network models may be short, and some may be long, some may have a short latency (e.g., short training time) and others may have a long latency (e.g., long training time). Some neural network model may require faster machines, or more memory, and each may generally require a different profile machine. Additionally, as is explained above, machine learning is execution aware, meaning that if training of a neural network ML model is blindly transferred from a first machine to a second machine, and the second machine does not match the first machine in terms of computing power and characteristics, then correctness problems may arise. As an example, when moving between GPUs and CPUs, it may take many CPUs to get the same computing capability as a single GPU. To illustrate, it may take 8 CPUs to get the same throughput as a single GPU, which means that in order to get the same throughput when transferring training from a GPU to a set of CPUs, 8 CPUs may be needed. A GPU may run optimally with a mini-batch size of 32 while a CPU chip may run optimally with a mini-batch size of 16. With 8 CPUs, the aggregate mini-batch size would therefore be 128 (i.e., 8×16). The difference in the mini-batch size could lead to correctness problems, and as such algorithmic adjustments may be needed to yield the same accuracy. To avoid such problems, in particular embodiments master ML control system 21 may introduce check-point handshaking, wherein it compares the configuration of a first machine wherein a check-point is generated to the configuration of a target machine (or training group) to where a neural network model (or graph-segment of the neural network ML model) is to be transferred, identifies hyper-parameters of the training technique (e.g., distributed SGD, or other gradient descent-based technique) being used to train the neural network on the first machine, and adjusts at least part of these hyper-parameters in accordance with (hardware or performance) characteristics (e.g., type) of the target machine (or training group) so that the target machine (or training group) produces training results (e.g., weights or parameters) similar to, e.g., within a predefined percentage range, of training results achievable by the first machine if its training of the neural network ML model had not been interrupted (e.g., with its original hyper-parameter settings). For example, if the first machine were a GPU-based machine (e.g., having 8 GPUs) operating at a high processing speed, and the target machine (or training group) were CPU-based, then the master ML control system 21 may set a hyper-parameter for the target machine to define a larger batch size in order obtain a similar speed as the first machine.

In particular embodiments, the master ML control 21 system may automatically adjust select hyper-parameters when transferring the training of a neural network ML mode from a first machine of a first type to one or more second machines. As is explained above, when a neural network is first setup for training on a first machine, various hyper-parameters may need to be fine tuned (e.g., in a trial-and-error manner) to identify a workable set of hyper-parameters for the specific characteristics (e.g., type) of the first machine that permits the first machine to converge to an answer. The master ML control system 21 may modify select parameters in this workable set of hyper-parameters in accordance with select characteristics of the target machine (or training group). In particular embodiments, these select parameters may be modified based on the number of machines (or CPUs or GPUs) in a target training group (or target machine). For purposes of this discussion, the number of machines (or CPUs or GPUs) (such as those in the target training group (or target machine)) may be termed machine-nodes.

In particular embodiments, the hyper-parameters modified by the master ML control system 21 may include a batch size and learning rate. As discussed above, the batch size (which as used herein encompass mini-batch size) may refer to the number of training data units (e.g., input-output training pairs), taken from a complete training set, that are processed (e.g., back-propagated through the neural network) during each iteration in an epoch. The learning rate may be a multiplier that controls how much a parameter (e.g., weight) may change during each epoch or during each back-propagation iteration. For example, if the learning rate is denoted as "alpha", and a gradient change (e.g., an amount by which a parameter (weight) is determined to be changed by the gradient descent method being used during a training iteration) is "delta", then the actual amount by which the parameter may change may be limited, for example, to parameter=parameter−(alpha*delta) in a case where the parameter should be reduced, or to: parameter=parameter+(alpha*delta) in a case where the parameter should be increased.

When transferring training of a neural network model (or a graph-segment(s) of a neural network model) from a first machine (or first training group) on which the neural network model (or a graph-segment(s) of a neural network model) was being trained to a second machine (or second training group), the master ML control system 21 may select a second batch size (e.g., mini-batch size) based on (e.g., selected to be large enough to make good utilization of) the hardware of the second machine (or second training group), and select a second learning rate that is linearly based on a change in batch size (from the first to second machine, or learning group) represented by the choice of second batch size. For example, if the batch size and learning rate used by the first machine (or first training group) are a first batch size and a first learning rate, respectively, then the second learning rate may represent a change in the first learning rate that is directly proportional to a ratio of the second batch size to the first batch size. More specifically, if the second batch size divided by the first batch size is "k", then the second learning rate may be set to the first learning rate multiplied by k. In particular embodiments, once the second batch size and second learning rate for the second machine (or training group) are determined, the second machine (or training group) may be incrementally ramped up starting from the first batch size and first learning rate to the second batch size and second learning rate in a predetermined number (e.g., 1, 2, 5, etc.) of training epochs or iterations. The present method for selection and implementation of a second batch size and second learning rate has been found to provide consistent performance (e.g., training error is kept to within an acceptable range) in transferring the training of a neural network model with changes in batch size in a range from a first batch size of 1 to a second batch size of 8192 (e.g., changes in batch sizes spanning three dimensions of magnitude).

In particular embodiments, (e.g., to make good utilization of available hardware) the master ML control system 21 may assign a default batch size of 32 per GPU and a default batch size of 16 per CPU, and thereby select an appropriate second batch size based on the hardware, or type, of the second machine (or second training group), e.g., based on the number of GPUs and CPUs (e.g., machine-nodes) of the second machine (or second training group). This approach may provide accuracy and nearly-linear performance improvements when scaling to larger machine-node counts. For example, to transfer the training of a neural network ML model from a first machine (or first training group), a check-point would first be generated on the first machine (or first training group), which may include determined parameters of the neural network ML model. Based on the check-point, the neural network ML model may be rebuilt (e.g., hyper-parameters may be modified) for execution on a second machine (or second training group) that may be of the same or different type of hardware as the first machine (or first training group) where the check-point was generated. A second batch size would be selected based on the type of hardware and number of machine-nodes of the second machine (or second training group). As a simplified example, if the first machine (or first training group) had 8 GPUs, and the second machine (or second training group) had 64 CPUs (assuming a default batch size of 32 per GPU and a default batch size of 16 per CPU, as described above), then the first batch size of the first machine (or first training group) would be (8 multiplied by 32), or 256, and the selected second batch for the second machine (or second training group) would be (64 multiplied by 16), or 1024. An increase in batch size (e.g., mini-batch size) from 256 to 1024 would be a batch ratio of (1024/256) 4, and the second learning rate may be set to four times the first learning rate of the first machine (or first training group). In particular embodiments, however, a sudden change in learning rate may cause divergence (e.g., training error). So, the second machine (or second training group) may be made to warm up to the final run settings of the second batch size and second learning rate, where the transferred neural network ML model is started at the check-point on the second machine (or second training group) on only 16 of the available 64 CPUs (e.g., sufficient to process the same first batch size of 256 as was being used on the (8 GPU) first machine at the time the check-point was generated) using the same first learning rate the first machine was using at the time the check-point was generated, and then gradually (e.g., incrementally in consecutive epochs or iterations) increase the number of CPUs along with the batch size (e.g., a batch size increase of 16 per CPU) and the learning rate (e.g., a learning rate increase based on the ratio of the increased batch size and the first batch size) until reaching 64 CPUs, and reaching the second batch size and second learning rate. For example, the batch size and the learning rate may be gradually increased over the course of 5 epochs or iterations of training to a final second batch size and final second learning rate that depend directly on the number of machine-nodes (CPUs) used.

Once a check-point is created, the master ML control system 21 may transfer the training of a neural network ML model to another machine or training group. As stated above, a check point may be created on any given machine (or training group) immediately prior to halting the training of a neural network ML model on the given machine, but other triggering events may be used to signal the recording of a check-point. For example, if training is being executed on a training group made up of service server from bank 27 during off-peak hours, and it is determined that peak hours are approaching, a check-point may be created in anticipation of transferring training off the service machines because of the peak hours. Check-points may also be generated as a safe-guard from power outages or server failure. For example, if particular neural network ML model is very computing intensive, then check-points may be generated more frequently. Alternatively, check-points may be generated at predefined times or at regular time intervals. Further alternatively, a check-point may be generated every predetermined number of training iteration cycles or training epochs.

The master ML control system 21 may transfer the training of a neural network ML model from one machine (or training group) to another for various reasons. For example, if a particular neural network ML model needs large memory, and a training machine with large memory is not available, but many lower memory machines (e.g., many CPU based machines) are available, then the master ML control system 21 may distribute the neural network ML model across the many lower memory machines, even if processing may be slower. Alternatively, if a neural network ML model is being trained on one machine (or training group), and a faster machine (or training group) or a larger pool of similar machines (that have been determined to be capable of, or suitable for, training the neural network ML model) becomes available, then the master ML control system 21 may transfer training of the neural network ML model to obtain faster processing. Alternatively, if a node (e.g., on one graph-segment) is waiting for an output from another node (e.g., from another graph-segment), then the training of the other node may be transferred to a faster machine (or training group) to reduce wait time. The master ML control system 21 may further transfer training of a neural network ML model from a first machine (or training group) if the master ML control system 21 determines that another machine (or training group) that has computing resources more closely matching computing requirements of the neural network ML model becomes available. Additionally, some training operations may be under a service-level agreement (e.g., a prearranged agreement dictating a preferred completion time). In this case, the master ML control system 21 may transfer training of a neural network ML model (that has a service-level agreement) from a first machine (or training group) to a second machine (or training group) if it determines that first machine (or training group) is unable to finish the training of the neural network ML model in time to meet its service-training agreement, but the second machine (or training group) is able to meet its service-level agreement.

Figure 9:
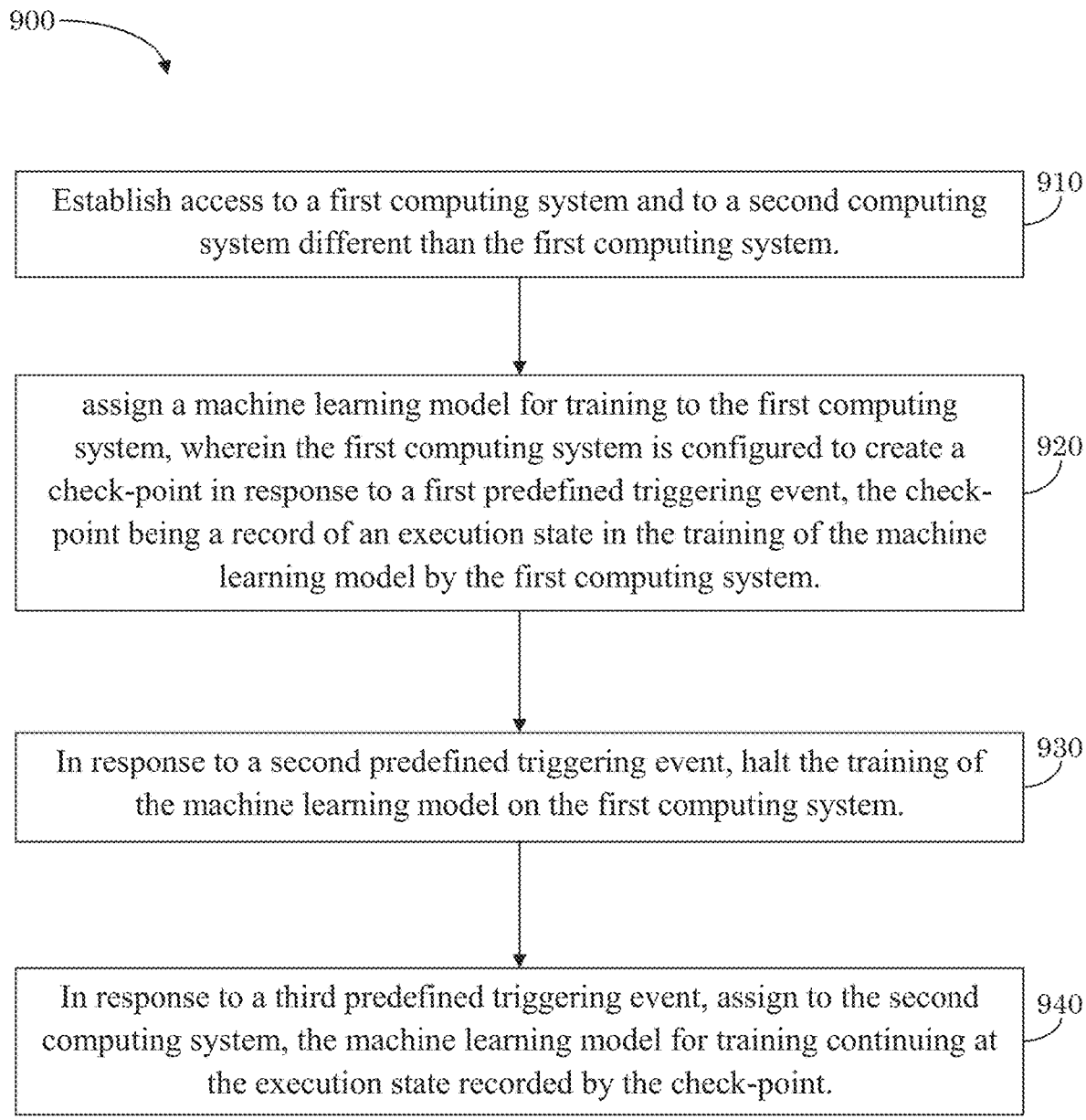
FIG. 9 illustrates an example method 900 for training a neural network machine learning model across different computing systems having different computer architectures/characteristics.

FIG. 9 illustrates an example method 900 for training a neural network machine learning model across different computing systems having different computer architectures/characteristics. The method may begin at step 910, where the master ML control system 21 (or scheduler machine) may establish access to a first computing system (e.g., ML training system 23 of FIG. 8) and to a second computing system (e.g., training group 27D of FIG. 8) different than the first computing system. At step 920, the scheduler machine may assign a neural network ML model for training to the first computing system. The first computing system may be configured to create a check-point in response to a first predefined triggering event, such as an instruction from the scheduler machine or a determination that training on the first computing system should be stopped, or are arrival of regularly scheduled check-point generating time, or completion of a predefined number of training iterations. The check-point may be a record of an execution state in the training of the neural network ML model by the first computing system. At step 930, in response to a second predefined triggering event (such as the approach of peak-use hours for the first computing system or faster machine or training group becoming available), the scheduler machine may halt the training of the neural network ML model on the first computing system. At step 940, in response to a third predefined triggering event (such as the second computing system being faster than the first computing system and becoming available, or the second computing system having hardware characteristics that more closely match the needs of the neural network ML model becoming available, or determination that the second computing system may be better suited for meeting a service-level agreement), assign to the second computing system, the machine learning model for training continuing at the execution state recorded by the check-point. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for training a neural network machine learning model across different computing systems having different computer architectures/characteristics including the particular steps of the method of FIG. 9, this disclosure contemplates any suitable method for training a neural network machine learning model across different computing systems having different computer architectures/characteristics including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
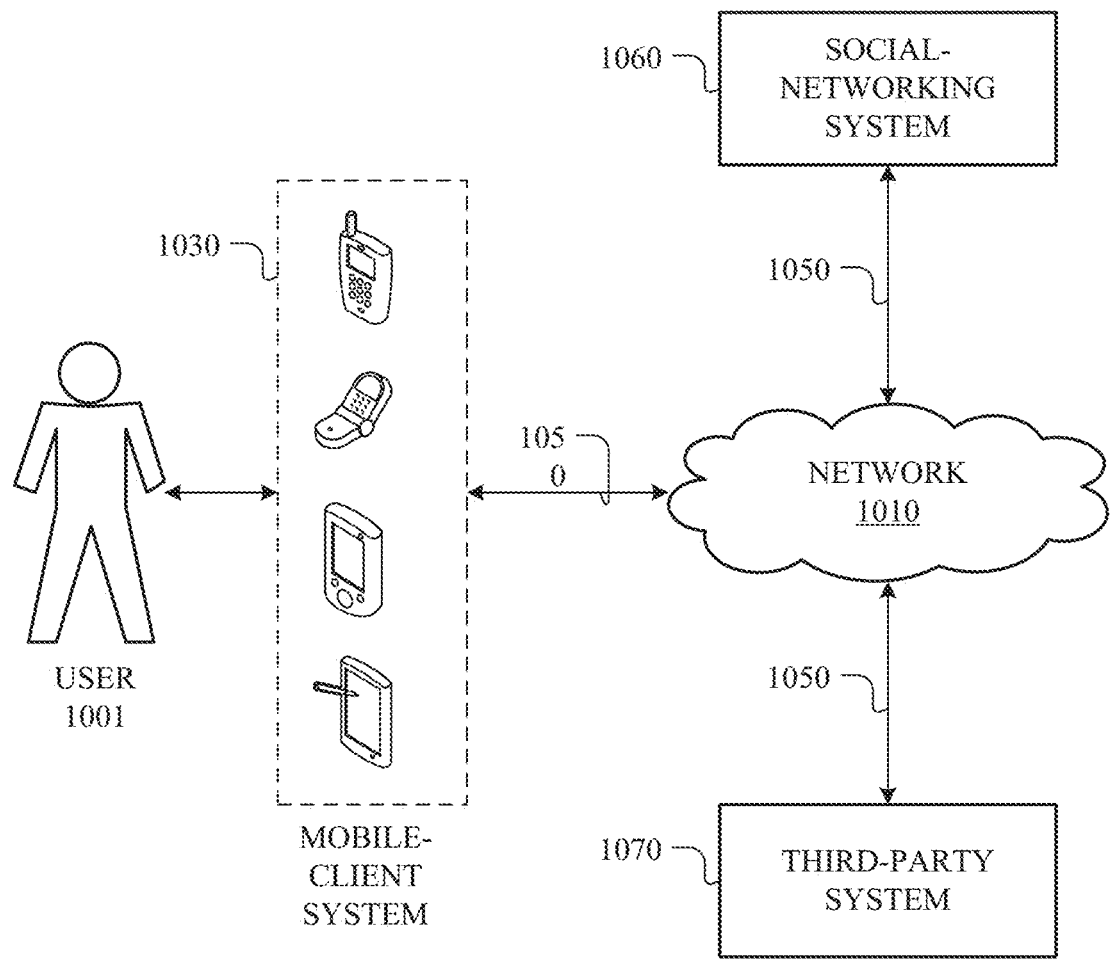
FIG. 10 illustrates an example network environment associated with a social-networking system.

FIG. 10 illustrates an example network environment 1000 associated with a social-networking system. Network environment 1000 includes a user 1001, a client system 1030, a social-networking system 1060, and a third-party system 1070 connected to each other by a network 1010. Although FIG. 10 illustrates a particular arrangement of user 1001, client system 1030, social-networking system 1060, third-party system 1070, and network 1010, this disclosure contemplates any suitable arrangement of user 1001, client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of users 1001, client systems 1030, social-networking systems 1060, third-party systems 1070, and networks 1010, this disclosure contemplates any suitable number of users 1001, client systems 1030, social-networking systems 1060, third-party systems 1070, and networks 1010. As an example and not by way of limitation, network environment 1000 may include multiple users 1001, client system 1030, social-networking systems 1060, third-party systems 1070, and networks 1010.

In particular embodiments, user 1001 may be an individual (human user), an entity (e.g., an enterprise, business, or third-party application), or a group (e.g., of individuals or entities) that interacts or communicates with or over social-networking system 1060. In particular embodiments, social-networking system 1060 may be a network-addressable computing system hosting an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. In particular embodiments, social-networking system 1060 may include an authorization server (or other suitable component(s)) that allows users 1001 to opt in to or opt out of having their actions logged by social-networking system 1060 or shared with other systems (e.g., third-party systems 1070), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 1070 may be a network-addressable computing system that can host a third party webpage. Third-party system 1070 may generate, store, receive, and send content, such as, for example, ads identified by social-networking system 1060. Third-party system 1070 may be accessed by the other components of network environment 1000 either directly or via network 1010. In particular embodiments, one or more users 1001 may use one or more client systems 1030 to access, send data to, and receive data from social-networking system 1060 or third-party system 1070. Client system 1030 may access social-networking system 1060 or third-party system 1070 directly, via network 1010, or via a third-party system. As an example and not by way of limitation, client system 1030 may access third-party system 1070 via social-networking system 1060. Client system 1030 may be any suitable computing device, such as, for example, a personal computer, a laptop computer, a cellular telephone, a smartphone, a tablet computer, or an augmented/virtual reality device.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

Figure 11:
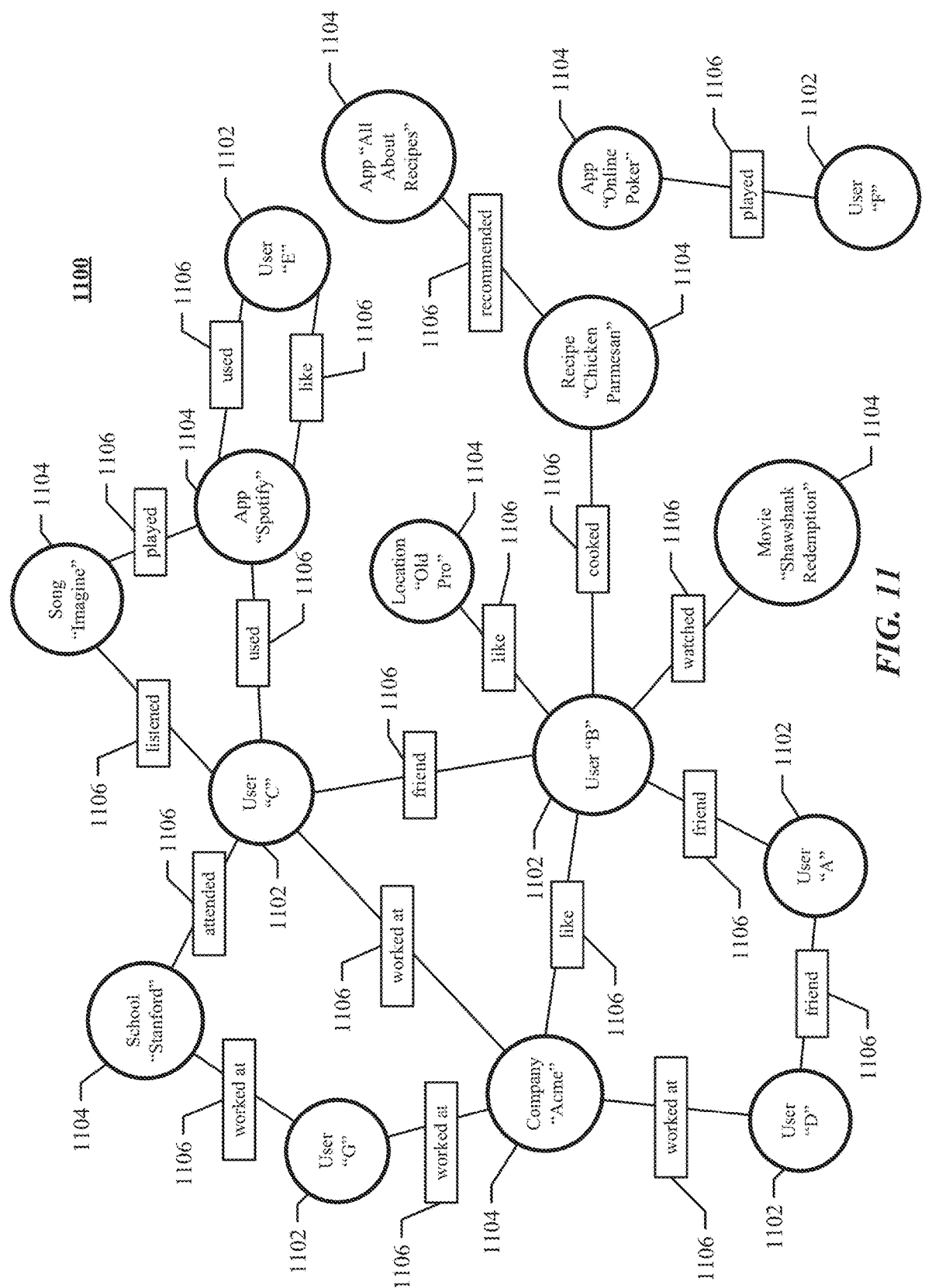
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party system 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1030 to send to social-networking system 1060 a message indicating the user's action. In response to the message, social-networking system 1060 may create an edge (e.g., a check-in-type edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 1064. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1060). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1060 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1060) or RSVP (e.g., through social-networking system 1060) to an event associated with the advertisement. In addition or as an alternative, an advertisement may include social-networking-system content directed to the user. As an example and not by way of limitation, an advertisement may display information about a friend of the user within social-networking system 1060 who has taken an action associated with the subject matter of the advertisement.

Figure 12:
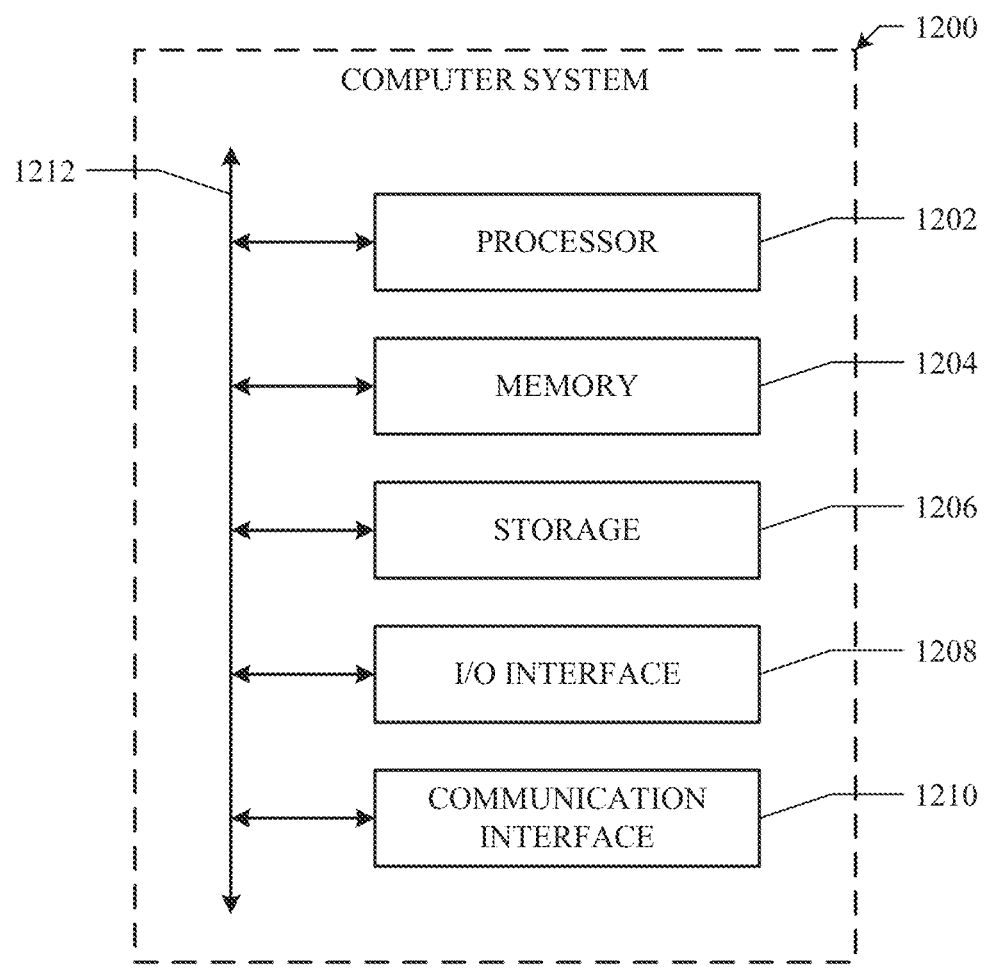
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a first computing system, establishing access to a second computing system and to a third computing system different than the second computing system;
   by the first computing system, assigning a machine learning model for training to the second computing system, wherein the second computing system is configured to create a check-point in response to a first predefined triggering event, the check-point being a record of an execution state in the training of the machine learning model by the second computing system;
   by the first computing system, in response to a second predefined triggering event, halting the training of the machine learning model on the second computing system;
   by the first computing system, adjusting the check-point based on a comparison between configurations of the second and third computing systems; and
   by the first computing system, in response to a third predefined triggering event, assigning to the third computing system, the machine learning model for training continuing at the execution state recorded by the check-point based on the adjusted check-point.

2. The method of claim 1, wherein:
   the assigning of the machine learning model for training to the second computing system includes specifying a first value for a training parameter related to the training of the machine learning model, the first value being based on select performance characteristics as determined for the second computing system;
   the assigning of the machine learning model for training to the third computing system includes specifying a second value for the training parameter based on said select performance characteristics as determined for the third computing system, the second value being different than the first value; and
   the second value is determined to cause the third computing system to produce training results similar to, within a predefined percentage range, training results achievable by the second computing system with its training parameter set to the first value.

3. The method of claim 1, wherein:
   the second computing system and third computing system train the machine learning model using gradient descent and configurable hyper-parameters, including a learning rate and a batch size of training samples;
   the assigning of the machine learning model for training to the second computing system includes specifying a first learning rate and a first batch size corresponding to the learning rate and the batch size of training samples, respectively, of the configurable hyper-parameters used by the second computing system; and
   the assigning of the machine learning model for training to the third computing system includes specifying a second learning rate based on a second batch size supported by the third computing system, the second learning rate being directly proportional to a batch-ratio of the second batch size to the first batch size.

4. The method of claim 3, wherein the second batch size and the first batch size differ by a range of from one to three orders of magnitude.

5. The method of claim 3, wherein the gradient descent is stochastic gradient descent, and the second learning rate is based on a product of the batch-ratio and the first learning rate.

6. The method of claim 3, wherein:
   the second computing system and third computing system each trains the machine learning model in a series of iterative cycles, with each iterative cycle being a full training propagation sequence through the machine learning model; and
   the assigning of the machine learning model for training to the third computing system includes, incrementally ramping, in discrete steps at consecutive iterative cycles, the learning rate of the third computing system starting from the first learning rate to the second learning rate.

7. The method of claim 1, wherein the first predefined triggering event is one of a regular time interval, a specified number of training iteration cycles, or an instruction from the first computing system to halt execution of the training of the machine learning model.

8. The method of claim 1, wherein:
   the machine learning model is defined by an operational nodal graph, where graph nodes of the operational graph model correspond to operations of the machine learning model and interconnections between graph nodes correspond to operational relationships between operations of the machine learning model; and
   the second computing system creates the check-point based on the operational nodal graph.

9. The method of claim 8, wherein:
   in response to the first predefined triggering event, the second computing system continues training the machine learning model according to the operational nodal graph, and creates the check-point when the execution state reaches a predefined execution point in the operational nodal graph.

10. The method of claim 9, wherein the predefined execution point includes at least one of: an end of a current iteration of the operational nodal graph, finishing processing of a predefined layer of nodal operations within the operational nodal graph, or finishing processing of any nodes being executed when the first predefined triggering event occurred.

11. The method of claim 1, wherein:
    the second computing system is characterized by a peak-usage period during which it is not to train the machine learning model; and
    the second predefined triggering event is based on the peak-usage period.

12. The method of claim 1, wherein the third predefined triggering event includes the third computing system becoming available.

13. The method of claim 1, wherein the third predefined triggering event is based on a determination that the third computing system is capable of training the machine learning model and is available.

14. The method of claim 13, further comprising:
    by the first computing system, establishing access to a plurality of said third computing systems, each having different computing characteristics;
    wherein the second and third predefined triggering events include, by the first computing system, determining that one of the third computing systems has computing resources more closely matching computing requirements of the machine learning model than the second computing system and is available.

15. The method of claim 1, wherein the third predefined triggering event is triggered based on a determination that the third computing system is able to meet a service-level agreement associated with the machine learning model and that the second computing system is unable to meet the service-level agreement.

16. One or more computer-readable non-transitory storage media embodying software that is operable when executed to:
   establish access to a first computing system and to a second computing system different than the first computing system;
   (ii) assign a machine learning model for training to the first computing system, wherein the first computing system is configured to create a check-point in response to a first predefined triggering event, the check-point being a record of an execution state in the training of the machine learning model by the first computing system;
   (iii) in response to a second predefined triggering event, halt the training of the machine learning model on the first computing system;
   (iv) adjust the check-point based on a comparison between configurations of the first and second computing systems; and
   (v) in response to a third predefined triggering event, assign to the second computing system, the machine learning model for training continuing at the execution state recorded by the check-point based on the adjusted check-point.

17. The media of claim 16, wherein:
   the first computing system and second computing system train the machine learning model using gradient descent and configurable hyper-parameters, including a learning rate and a batch size of training samples;
   step (ii) includes specifying a first learning rate and a first batch size corresponding to the learning rate and the batch size of training samples, respectively, of the configurable hyper-parameters used by the first computing system; and
   step (v) includes specifying a second learning rate based on a second batch size supported by the second computing system, the second learning rate being directly proportional to a batch-ratio of the second batch size to the first batch size.

18. The media of claim 17, wherein:
   the first computing system and second computing system each trains the machine learning model in a series of iterative cycles, with each iterative cycle being a full training propagation sequence through the machine learning model; and
   step (v) includes incrementally ramping, in discrete steps at consecutive iterative cycles, the learning rate of the second computing system starting from the first learning rate to the second learning rate.

19. A system comprising:
one or more processors; and
one or more computer-readable non-transitory storage media coupled to one or more of the processors and comprising instructions operable when executed by one or more of the processors to cause the system to:
   (i) establish access to a first computing system and to a second computing system different than the first computing system;
   (ii) assign a machine learning model for training to the first computing system, wherein the first computing system is configured to create a check-point in response to a first predefined triggering event, the check-point being a record of an execution state in the training of the machine learning model by the first computing system;
   (iii) in response to a second predefined triggering event, halt the training of the machine learning model on the first computing system;
   (iv) adjust the check-point based on a comparison between configurations of the first and second computing systems; and
   (v) in response to a third predefined triggering event, assign to the second computing system, the machine learning model for training continuing at the execution state recorded by the check-point based on the adjusted check-point.

20. The system of claim 19, wherein:
the first computing system and second computing system train the machine learning model using gradient descent and configurable hyper-parameters, including a learning rate and a batch size of training samples;
step (ii) includes specifying a first learning rate and a first batch size corresponding to the learning rate and the batch size of training samples, respectively, of the configurable hyper-parameters used by the first computing system; and
step (v) includes specifying a second learning rate based on a second batch size supported by the second computing system, the second learning rate being directly proportional to a batch-ratio of the second batch size to the first batch size.

\* \* \* \* \*